United States Patent
Ren et al.

(10) Patent No.: US 10,771,386 B2
(45) Date of Patent: Sep. 8, 2020

(54) IP ROUTING SEARCH

(71) Applicant: NEW H3C TECHNOLOGIES CO., LTD., Hangzhou (CN)

(72) Inventors: Kai Ren, Beijing (CN); Changzhong Ge, Beijing (CN); Shaoliang An, Beijing (CN)

(73) Assignee: NEW H3C TECHNOLOGIES CO., LTD, Hangzhou (CN)

( * ) Notice: Subject to any disclaimer, the term of this patent is extended or adjusted under 35 U.S.C. 154(b) by 265 days.

(21) Appl. No.: 15/574,440

(22) PCT Filed: Jun. 30, 2016

(86) PCT No.: PCT/CN2016/087830
§ 371 (c)(1),
(2) Date: Nov. 15, 2017

(87) PCT Pub. No.: WO2017/000893
PCT Pub. Date: Jan. 5, 2017

(65) Prior Publication Data
US 2018/0145911 A1    May 24, 2018

(30) Foreign Application Priority Data

Jun. 30, 2015 (CN) .......................... 2015 1 0384763

(51) Int. Cl.
*H04L 12/743* (2013.01)
*H04L 12/741* (2013.01)
(Continued)

(52) U.S. Cl.
CPC ...... *H04L 45/7453* (2013.01); *H04L 12/4641* (2013.01); *H04L 45/741* (2013.01); *H04L 45/745* (2013.01); *H04L 45/748* (2013.01)

(58) Field of Classification Search
CPC . H04L 12/4641; H04L 45/741; H04L 45/745; H04L 45/7453; H04L 45/748
(Continued)

(56) References Cited

U.S. PATENT DOCUMENTS

| 6,880,064 B1 | 4/2005 | Brown |
| 2004/0236720 A1* | 11/2004 | Basso ..................... H04L 12/66 |
| 2005/0175005 A1 | 8/2005 | Brown |

FOREIGN PATENT DOCUMENTS

| CN | 103414556 A | 11/2013 |
| CN | 103780491 A | 5/2014 |

(Continued)

OTHER PUBLICATIONS

Advanced Network Technology Center, University of Oregon, University of Oregon Route Views Project. Retrieved online at http://www.routeviews.org/. 5 pages. (Jan. 27, 2005).
(Continued)

*Primary Examiner* — Mark H Rinehart
*Assistant Examiner* — Kokou R Detse
(74) *Attorney, Agent, or Firm* — McCarter & English, LLP; Kia L. Freeman; Thomas F. Foley

(57) ABSTRACT

A Multibit Trie is created for routing distribution of IP prefixes in each Virtual Private Network (VPN); and each Multibit Trie is divided into multiple layers. When routing search is performed for an IP address of a VPN, an input key is generated for each layer respectively, the input key of the layer comprises a VPN identifier of the VPN and bits corresponding to all of at least one layer before the layer in the IP address. A calculation is performed for the generated input key of each layer by using a Hash function of the layer, and routing is searched for according to a data structure information pointer of a Sub_Trie node corresponding to a longest Hash hit result.

16 Claims, 10 Drawing Sheets

---

601 — a Multibit Trie is created for routing distribution of IP prefixes in each VPN respectively, and each Multibit Trie is divided into multiple layers 602 — when routing search is performed for an IP address of a VPN, an input key is generated for each level respectively, an input key is generated for each layer respectively, the input key of the layer includes a VPN identifier of the VPN and bits corresponding to all of at least one layer before the layer in the IP address; a calculation is performed for the generated input key of each layer by using a Hash function of the layer; routing is searched for according to a data structure information pointer of a Sub_Trie node corresponding to a longest Hash hit result

(51) Int. Cl.
*H04L 12/46* (2006.01)
*H04L 12/749* (2013.01)
*H04L 12/745* (2013.01)

(58) Field of Classification Search
USPC .......................................................... 370/392
See application file for complete search history.

(56) References Cited

FOREIGN PATENT DOCUMENTS

| | | |
|---|---|---|
| CN | 104394077 A | 3/2015 |
| CN | 105141525 A | 12/2015 |

OTHER PUBLICATIONS

Bando et al., FlashTrie: Hash-based Prefix-Compressed Trie for IP Route Lookup Beyond 100Gbps. IEEE Infocom 2010 proceedings. 9 pages.

Eatherton et al., Tree Bitmap: Hardware/Software IP Lookups with Incremental Updates. Retrieved online at: http://citeseerx.ist.psu.edu/viewdoc/summary?doi=10.1.1.12.6583. 21 pages (2002).

IPv6 CIDR Report for Jan. 26, 2015. Archived online at Internet Archive. Retrieved from: https://web.archive.org/web/20150126210901/http://www.cidr-report.org/as2.0/ on Feb. 14, 2018. 47 pages (Jan. 26, 2015).

Mitzenmacher et al., Some Open Questions Related to Cuckoo Flashing. European Symposium on Algorithms. 10 pages (2009).

Mitzenmacher, Cuckoo Hashing and CAMs. Slideshow. [Cisco/Google 2008]. Retrieved online at: https://www.eecs.harvard.edu/~michaelm/Talks.html. 48 pages (2008).

Srinivasan et al., Fast Address Lookups Using Controlled Prefix Expansion. ACM Transactions on Computer Systems. Feb. 1999;17(1):1-40.

International Search Report for International Application No. PCT/CN2016/087830, dated Sep. 21, 2016 (3 pages).

Srinivasan et al., Fast and Scalable Layer Four Switching. Proceedings of the ACM Sigcomm '98 conference on Applications, Technologies, Architectures and Protocols for Computer Communication. pp. 191-202. 1998.

Ying Gao, The Research of IPv6 Routing Lookup Algorithm based on Hash Table and Multibit Trie, MS Thesis, Zhengzhou University, May 2010.

* cited by examiner

IP ROUTING SEARCH

RELATED APPLICATIONS

This application is a 35 U.S.C. § 371 national stage filing of International Application No. PCT/CN2016/087830, filed on Jun. 30, 2016, which claims priority to Chinese Patent Application No. 201510384763.5, filed on Jun. 30, 2015. The entire contents of each of the foregoing applications are incorporated herein by reference.

BACKGROUND

Network communications are performed to transfer data. Accordingly, one of functions of a network device is to perform high-efficiency data transfer. A function of the network device on a basic data plane of Internet protocol is routing search. The network device determines a next hop and an egress port for each received data packet according to prefix information in a routing table. Wildcard characters and Longest Prefix Matching (LPM) of Classless Inter-Domain Routing (CIDR) in the routing table make the routing search complex.

BRIEF DESCRIPTION OF THE DRAWINGS

FIG. 7-1 is a diagram illustrating a process of expanding routing of a prefix in level /0 to a prefix in level /1 with reference to the Unibit Trie shown in FIG. 1 according to some examples of the present disclosure.

FIG. 7-2 is a diagram illustrating a process of expanding routing of a prefix in level /1 to a prefix in level /2 with reference to the Unibit Trie shown in FIG. 1 according to some examples of the present disclosure.

FIG. 7-3 is a diagram illustrating a process of expanding routing of a prefix in level /2 to a prefix in level /3 with reference to the Unibit Trie shown in FIG. 1 according to some examples of the present disclosure.

DETAILED DESCRIPTION

A Tree Bitmap is a routing search algorithm based on a Multibit Trie, and may be applied to Carrier Routing System (CRS) series high-end routers. A Unibit Trie and the Multibit Trie will be illustrated to learn the Tree Bitmap.

Figure 1:
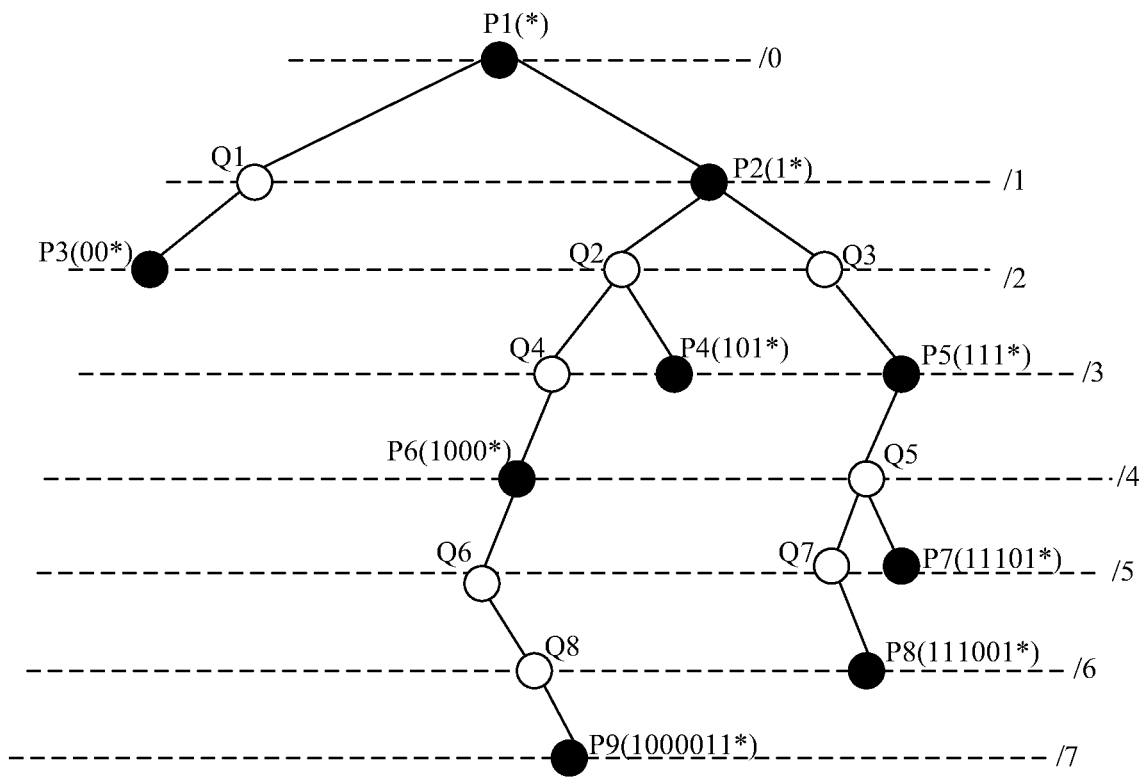
FIG. 1 is a diagram illustrating a Unibit Trie.

FIG. 1 is a diagram illustrating a Unibit Trie. The Unibit Trie shown in FIG. 1 includes nine IPv4 prefixes, represented as P1~P9. A prefix P1 of the highest node of the Unibit Trie is *. A prefix Q1 of the next-level left branch of the prefix P1 is 0*, and a prefix P2 of the next-level right branch of the prefix P1 is 1*. A prefix P3 of the next-level left branch of the prefix Q1 is 00*, a prefix Q2 of the next-level left branch of the prefix P2 is 10*, a prefix Q3 of the next-level right branch of the prefix P2 is 11*, and so on. The "*" indicates a location where a prefix is located. For example, for any prefix N in the Unibit Trie, a prefix of the next-level left branch of the prefix N is N0 and a prefix of the next-level right branch of the prefix N is N1.

In the Unibit Trie shown in FIG. 1, a "●" node indicates a node where a routing prefix is valid, and a "○" node indicates a node where a routing prefix is invalid. As shown in FIG. 1, the prefixes P1~19 correspond to nodes where routing prefixes are valid, and the prefixes Q1~Q8 correspond to nodes where routing prefixes are invalid. In some examples of the present disclosure, a node where a routing prefix is valid indicates that the node is configured with routing.

A routing search process based on LPM in the Unibit Trie is described as follows.

If LPM routing of an IPv4 prefix is to be searched, according to a descending order of bits in the IPv4 prefix, one bit of the IPv4 prefix is searched in the Unibit Trie every time. If the bit is "0", a next-level left branch of the Unibit Trie is found, if the bit is "1", a next-level right branch of the Unibit Trie is found, and so on. The search operation is performed until the bottom of the Unibit Trie, and routing of the last "●" node is the LPM routing of the IPv4 prefix.

For example, if LPM routing of an IPv4 prefix 10000110 is to be searched in the Unibit Trie shown in FIG. 1, a LPM routing search process includes:

determining the highest bit of the IPv4 prefix 10000110, i.e., "1", and entering the next-level right branch P2 from P1 of the Unibit Trie, which is represented as P1→P2;

determining the second bit of the IPv4 prefix 10000110, i.e., "0", and entering the next-level left branch Q2 from P2 of the Unibit Trie, which is represented as P2→Q2;

determining the third bit of the IPv4 prefix 10000110, i.e., "0", and entering the next-level left branch Q4 from Q2 of the Unibit Trie, which is represented as Q2→Q4;

determining the fourth bit of the IPv4 prefix 10000110, i.e., "0", and entering the next-level left branch P6 from Q4 of the Unibit Trie, which is represented as Q4→P6;

determining the fifth bit of the IPv4 prefix 10000110, i.e., "0", and entering the next-level left branch Q6 from P6 of the Unibit Trie, which is represented as P6→Q6;

determining the sixth bit of the IPv4 prefix 10000110, i.e., "1", and entering the next-level right branch Q8 from Q6 of the Unibit Trie, which is represented as Q6→Q8;

determining the seventh bit of the IPv4 prefix 10000110, i.e., "1", and entering the next-level right branch P9 from Q8 of the Unibit Trie, which is represented as Q8→P9. At this time, the bottom of the Unitbit Trie has been searched, and thus the LPM routing search process terminates. Since P9 corresponds to the last "●" node, routing of P9 is the LPM routing of the IPv4 prefix 10000110.

When the LPM routing of the IPv4 prefix 10000110 is searched in the Unibit Trie, seven search operations are performed via P1→P2→Q2→Q4→P6→Q6→Q8→P9.

Figure 2:
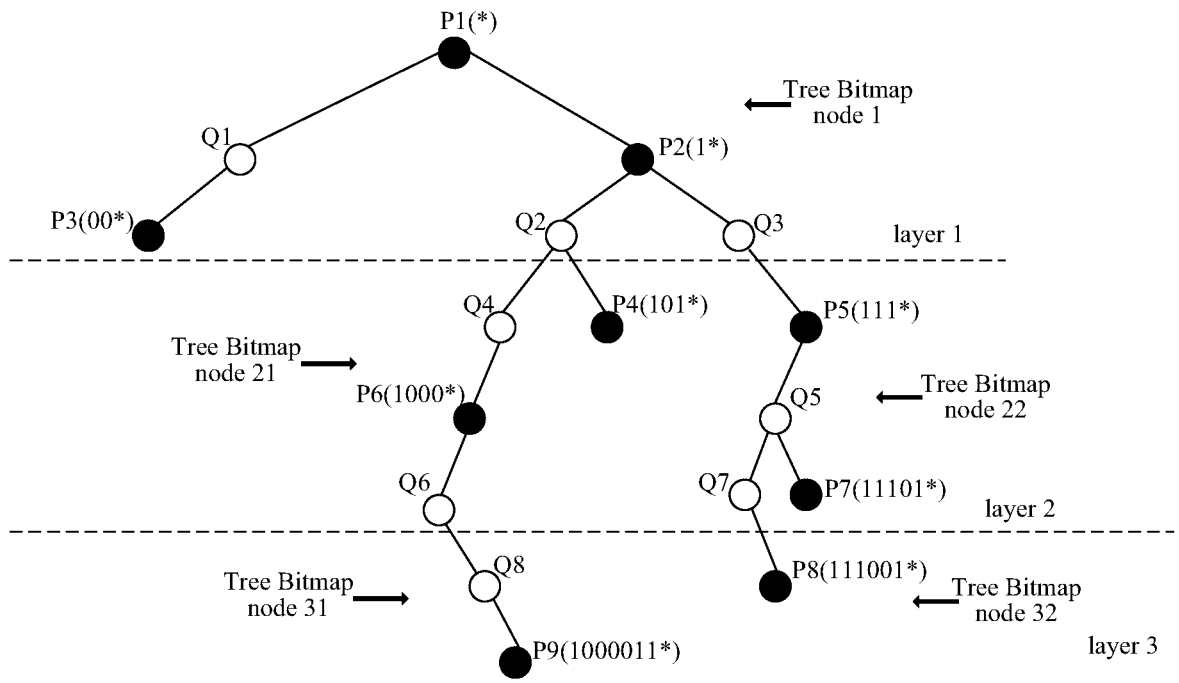
FIG. 2 is a diagram illustrating a conversion process from a Unibit Trie to a Multibit Trie.

A Multibit Trie may be created based on the Unibit Trie. In the Multibit Trie, every time LPM routing of a prefix is searched, multiple bits of the prefix may be searched. FIG. 2 is a diagram illustrating a conversion process from a Unibit Trie to a Multibit Trie. As shown in FIG. 2, every time LPM routing of a prefix is searched, three bits of the prefix are searched in the Multibit Trie. In this case, the search step size of the LPM routing is 3.

In a Tree Bitmap, the data structure of nodes in the Multibit Trie may be optimized, so as to be more suitable to hardware pipeline implementation of large access granularity architecture based on Static Random Access Memory (SRAM) and Dynamic Random Access Memory (DRAM). The Multibit Trie may be divided into multiple layers according to predefined search step size of LPM routing. For example, if the search step size of LPM routing is predefined as 3, the Multibit Trie shown in FIG. 2 may be divided into three layers, represented as layer 1, layer 2 and layer 3. In some examples of the present disclosure, a Multibit Trie includes prefixes of i levels, and the i levels are divided into j layers according to routing search size, wherein j≤i, each of the i levels is represented as "level", and each of the j layers is represented as "layer".

Figure 3:
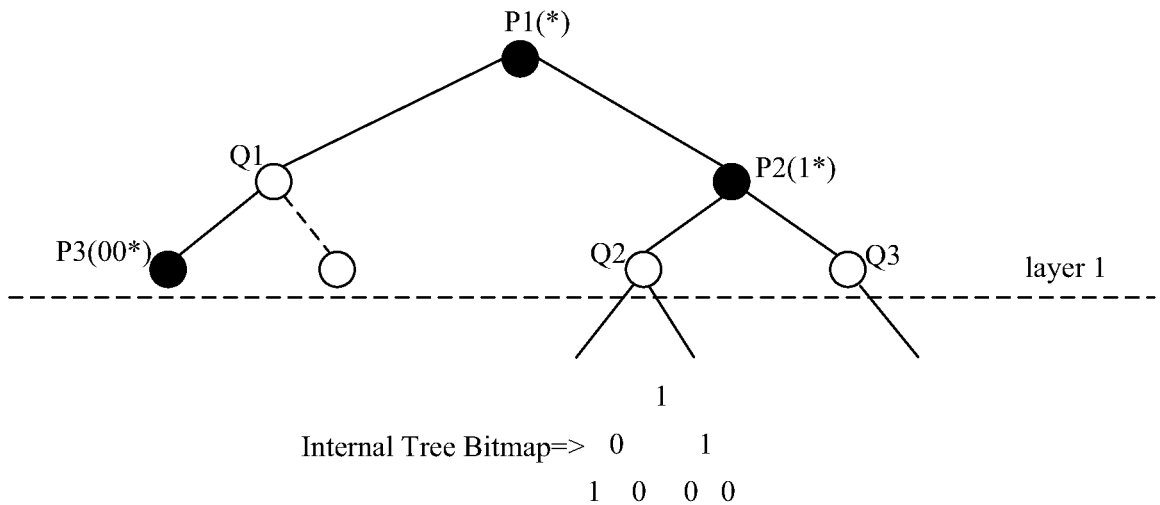
FIG. 3 is a diagram illustrating the structure of layer 1 shown in FIG. 2.

FIG. 3 is a diagram illustrating the structure of layer 1 shown in FIG. 2.

In the Multibit Trie, each layer includes one or more Tree Bitmap node(s). Each Tree Bitmap node in a layer has a highest-level prefix of the layer, and the highest-level prefix and its descendant prefixes form a sub_Trie.

In some examples, the search step size of the LPM routing is S and the Multibit Trie may be divided into N levels, represented as layers 1~N. Accordingly, layer 1 includes one Tree Bitmap node. Layer 2 includes $2^s$ highest-level prefixes at most, and each of the $2^s$ highest-level prefixes and its descendant prefixes form a sub_Trie. Accordingly, layer 2 includes $2^s$ Tree Bitmap nodes at most, and layer m (1≤m≤N) includes $2^{(m-1)s}$ Tree Bitmap nodes at most.

For example, as shown in FIG. 2, layer 1 includes one Tree Bitmap node, layer 2 includes three Tree Bitmap nodes, and layer 3 includes two Tree Bitmap nodes.

Each Tree Bitmap node may be described with four parameters including an Internal Tree Bitmap, an Extending Paths Bitmap, a Result Array Pointer and a Child Node Pointer.

The Internal Tree Bitmap indicates routing distribution of prefixes inside a Tree Bitmap node. For example, when the search step size of LPM routing is S, there are $(2^s-1)$ prefixes inside the Tree Bitmap node at most. Accordingly, the Internal Tree Bitmap includes $(2^s-1)$ bits, and each bit of the Internal Tree Bitmap indicates whether a prefix inside the Tree Bitmap node is valid. If the prefix is valid, the value of the bit is "1"; if the prefix is invalid, the value of the bit is "0".

For example, as shown in FIG. 3, since the search step size of the LPM routing is S=3, the Internal Tree Bitmap of the Tree Bitmap node of layer 1 includes $2^3-1=7$ bits, represented as 1_01_1000, wherein "1" indicates that a corresponding prefix is valid, and "0" indicates that a corresponding prefix is invalid.

The Extending Paths Bitmap indicates distribution of next-level Tree Bitmap nodes of a Tree Bitmap node. For example, when the search step size of the LPM routing is S, the Tree Bitmap node has $2^s$ branches at most, and thus has $2^s$ next-level Tree Bitmap nodes at most. Accordingly, the Extending Paths Bitmap includes $2^s$ bits, and each bit indicates whether a branch of the Tree Bitmap node has a next-level Tree Bitmap node. When the branch of the Tree Bitmap node has a next-level Tree Bitmap node, the value of the bit is "1"; when the branch of the Tree Bitmap node has no next-level Tree Bitmap node, the value of the bit is "0".

For example, since the search step size of the LPM routing is S=3, the Tree Bitmap node of layer 1 shown in FIG. 3 has $2^3=8$ branches at most, and thus the Extending Tree Bitmap of the Tree Bitmap includes $2^3=8$ bits, represented as 00001101, wherein "1" indicates that a corresponding branch of the Tree Bitmap node has a next-level Tree Bitmap node, and "0" indicates that a corresponding branch of the Tree Bitmap node has no next-level Tree Bitmap node. As shown in FIG. 2, the Tree Bitmap node of layer 1 has three next-level Tree Bitmap nodes.

The Result Array Pointer refers to a head pointer of a Result Array (RA) corresponding to a valid prefix inside a Tree Bitmap node. The RA stores routing information of each valid prefix in the Tree Bitmap node, and the routing information includes Next Hop information, Forwarding Equivalence Class (FEC) information and so on.

The number of valid prefixes inside the Tree Bitmap node may be determined according to the Internal Tree Bitmap, and RA stores the routing information of the prefixes in order. For example, a RA pointed by the Result Array Pointer of the Tree Bitmap node of layer 1 shown in FIG. 3 stores routing information of P1, P2 and P3 in order and the Result Array Pointer points to the routing information of P1.

The Child Node Pointer refers to a head pointer of information of a next-level Tree Bitmap node of the Tree Bitmap node.

The distribution of the next-level Tree Bitmap node of the Tree Bitmap node may be determined according to the Extending Paths Bitmap. For example, branches having a next-level Tree Bitmap node may be determined. Information of all "valid" next-level Tree Bitmap nodes of the Tree Bitmap node is stored in a memory in order. The "valid" refers to that a corresponding bit in the Extending Paths Bitmap is "1".

For example, the Tree Bitmap node of layer 1 shown in FIG. 3 has three next-level Tree Bitmap nodes, and a memory pointed by the Child Array Pointer stores information of the three next-level Tree Bitmap nodes in order. The information of each next-level Tree Bitmap node is described with the Internal Tree Bitmap, the Extending Paths Bitmap, the Result Array Pointer and the Child Node Pointer.

For example, if the search step size of LPM routing is 3, the IPv4 prefix 10000110 is divided into multiple segments, represented as "100_001_10". If LPM routing of the IPv4 prefix is to be searched in the Multibit Trie shown in FIG. 2, a LPM routing search process is described as follows.

When the search step size of the LPM routing in FIG. 2 is 3, the highest 3 bits of the IPv4 prefix, i.e., "100", are obtained, and a prefix matching with "100" is searched in the Internal Tree Bitmap of the Tree Bitmap node in layer 1, wherein the Tree Bitmap node of layer 1 is called Tree Bitmap node 1, i.e. P1. As described above, the Internal Tree Bitmap of the Tree Bitmap node 1 in layer 1 is 1_01_1000, and thus it is determined that P1 and P2 match with "100". Because P2 has a longer prefix, a LPM matching result in layer 1 is P2.

A bit corresponding to the highest 3 bits "100" is searched in the Extending Paths Bitmap of the Tree Bitmap node in layer 1. The highest 3 bits "100" corresponds to the fifth branch of the Tree Bitmap node, and thus the fifth bit of the Extending Paths Bitmap is found. As described above, the Extending Tree Bitmap of the Tree Bitmap node in layer 1 is represented as 00001101, and thus the found bit is "1". Accordingly, it is determined that the branch corresponding to the highest 3 bits "100" has a next-level Tree Bitmap node and the next-level Tree Bitmap node is the first Tree Bitmap node pointed by the Child Node Pointer, i.e., the first Tree Bitmap node 21 in layer 2. As shown in FIG. 2, the first Tree Bitmap node 21 in layer 2 is Q4. Information of the Tree Bitmap node 21 is read from a memory by using the Child Node Pointer. The information of the Tree Bitmap node 21 includes the Internal Tree Bitmap, the Extending Paths Bitmap and the Child Node Pointer.

Then, the middle 3 bits of the IPv4 prefix, i.e., "001", are obtained and a prefix matching with "001" is searched in the Internal Tree Bitmap of the Tree Bitmap node 21. The Internal Tree Bitmap of the Tree Bitmap node 21 is 0_10_0000, and thus it is determined that P6 matches with "001". Accordingly, LPM matching result in layer 2 is P6.

A bit corresponding to the middle 3 bits "001" is searched in the Extending Paths Bitmap of the Tree Bitmap node 21 in layer 2. The middle 3 bits "001" corresponds to the second branch of the Tree Bitmap node 21, and thus the second bit of the Extending Paths Bitmap of the Tree Bitmap node 21 is found. The Extending Paths Bitmap of the Tree Bitmap node 21 is represented as 01000000, and the found bit is "1". Accordingly, it is determined that the Tree Bitmap node 21 has a next-level Tree Bitmap node and the next-level Tree Bitmap node is the first Tree Bitmap node pointed by the Child Node Pointer of the Tree Bitmap node 21, i.e., the first Tree Bitmap node 31 in layer 3. As shown in FIG. 2, the first Tree Bitmap node 31 in layer 3 is Q8. Information of the Tree Bitmap node 31 is read from the memory by using the Child Node Pointer of the Tree Bitmap node 21. The information of the Tree Bitmap node 31 includes the Internal Tree Bitmap, the Extending Paths Bitmap and the Child Node Pointer.

Since the Tree Bitmap node 31 is located at the bottom of the Multibit Trie and only has the Internal Tree Bitmap, the lowest 2 bits of the IPv4 prefix, i.e., "10", are obtained, and a prefix matching with "10" is searched in the Internal Tree Bitmap of the Tree Bitmap node 31. The Internal Tree Bitmap of the Tree Bitmap node 31 is 0_01, and thus it is determined that P9 matches with "10". Accordingly, a LPM matching result in layer 3 is P9.

By using the Multibit Trie, the number of search operations performed for the LPM routing may be greatly reduced. For example, when the LPM routing of the IPv4 prefix "10000110" is searched in the Multibit Trie, three search operations are performed via Tree Bitmap node 1→Tree Bitmap node 21→Tree Bitmap node 31.

In the search process of Tree Bitmap node 1→Tree Bitmap node 21→Tree Bitmap node 31, a LPM search result of nodes in each layer is transferred to nodes in a next layer, and the nodes in the next layer may obtain a LPM result thereof according to the transferred LPM result and transfer the obtained LPM result to nodes in a next layer. For example, the LPM result obtained by the Tree Bitmap node 1 is P2, and the Tree Bitmap node 1 transfers P2 to the Tree Bitmap node 21. The LPM result obtained by the Tree Bitmap node 21 is P6. P6 is longer than P2 transferred by the Tree Bitmap node 1, and thus P6 is transferred to the Tree Bitmap node 31. The LPM result obtained by the Tree Bitmap node 31 is P9. P9 is longer than P6, and thus is determined as a finial LPM result.

The RA pointer corresponding to P9 may be obtained according to the Internal Tree Bitmap and the Result Array Pointer of the Tree Bitmap 31, and the RA is read from the memory and determined as the final LPM routing.

In the above search process, four search operations are performed in memory, which include operations of searching for information of the Tree Bitmap node 1, searching information of the Tree Bitmap node 21, searching information of the Tree Bitmap node 31 and searching the RA.

Figure 4:
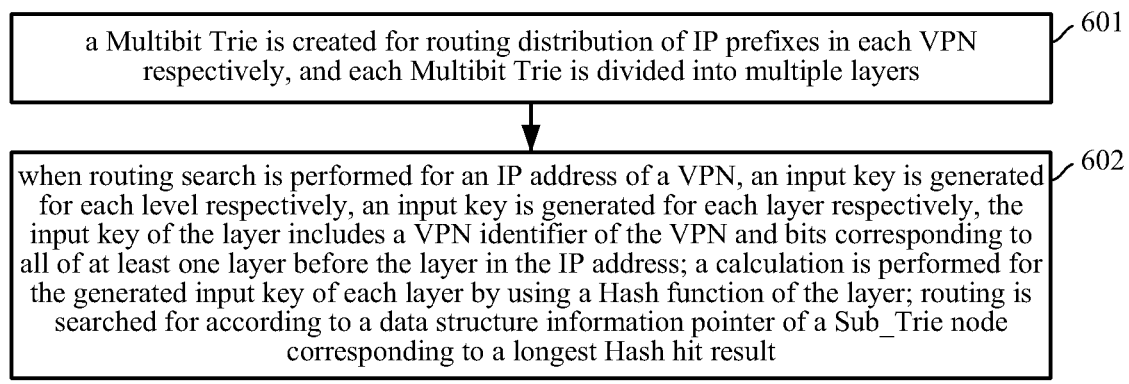
FIG. 4 is a flowchart illustrating an IP routing search method based on a Multibit Trie according to some examples of the present disclosure.

FIG. 4 is a flowchart illustrating an IP routing search method based on a Multibit Trie according to some examples of the present disclosure. As shown in FIG. 4, the method includes the following blocks.

At block 601, a Multibit Trie is created for routing distribution of IP prefixes in each VPN respectively, and each Multibit Trie is divided into multiple layers.

At block 602, when routing search is performed for an IP address of a VPN, an input key is generated for each layer respectively, an input key is generated for each layer respectively, the input key of the layer includes a VPN identifier of the VPN and bits corresponding to all of at least one layer before the layer in the IP address; a calculation is performed for the generated input key of each layer by using a Hash function of the layer;

routing is searched for according to a data structure information pointer of a Sub_Trie node corresponding to a longest Hash hit result.

In some examples, for each Sub_Trie node of a first level in each layer, a preconfigured input key including a current VPN identifier and bits corresponding to all of at least one layer before a current layer in an IP address of an IP prefix of a current Sub_Trie node. It is preconfigured that, a calculation is performed for the preconfigured input key by using a preconfigured Hash function of the current layer, and a Hash calculation result is mapped to the data structure information pointer of the current Sub_Trie node.

In some examples, multiple Hash functions are preconfigured for each layer. Each Hash function corresponds to a Hash table. Each location in the Hash table uniquely represents a Hash calculation result, and each location is used to store an input key corresponding to the Hash calculation result represented by the location and a data structure information pointer of a Sub_Trie node corresponding to the input key.

The processing of performing the calculation for the preconfigured input key by using the preconfigured Hash function of the layer includes the following steps.

At step a, the calculation is performed for the preconfigured input key of the layer by using the preconfigured multiple Hash functions of the current layer respectively, and a location corresponding to each Hash calculation result is found in the Hash table corresponding to the Hash function.

If any one of multiple locations found in the multiple Hash tables is empty, the preconfigured input key and a data structure information pointer of a Sub_Trie node corresponding to the preconfigured input key are stored in the empty location.

If none of multiple locations found in the multiple Hash tables is empty, a location is selected randomly from the multiple locations, an input key and a data structure information pointer of a Sub_Trie node both stored in the selected location are removed, and the preconfigured input key and a data structure information pointer of a Sub_Trie node corresponding to the preconfigured input key are stored in the selected location.

At step b, after the input key and the data structure information pointer of the Sub_Trie node are removed, it is determined whether the number of input keys removed continuously reach a preset value, if the number of input keys removed continuously reach the preset value, the removed input key and the data structure information pointer of the Sub_Trie node are stored in a removed key list; if the number of input keys removed continuously does not reach the preset value the removed input key is taken as a preconfigured input key to perform the processing of step a. In some examples, at block 602, the processing of performing the calculation for the generated input key of each layer by using the Hash function of the layer may be as follows.

The calculation is performed for the generated input key of each layer by using the multiple Hash functions of the layer, and multiple Hash calculation results are obtained.

For each Hash calculation result corresponding to the Hash function, the Hash table corresponding to the Hash function is searched for a location corresponding to the Hash calculation result. If the location is found, an input key stored at the location is compared with the generated input key. If the input key stored at the location is identical with the generated input key, the Hash calculation result is determined as the Hash hit result. If the input key stored at the location is different from the generated input key, the removed key list of the layer is searched for the generated input key. If the removed key list includes an input key identical with the generated input key, the Hash calculation result is determined as the Hash hit result.

In some examples, each Hash function corresponding to a Hash table includes: in the same layer of the Multibit Tries of all VPNs, the same Hash function uses the same Hash table.

In some examples, at block 601, after the Multibit Trie is created, the following processing is further included.

Routing of IP prefixes in the highest levels 1~m of the Multibit Trie are expanded to IP prefixes in level m+1 according to a prefix expansion method. Each branch of the IP prefixes in the level m+1 of the Multibit Trie is taken as a Branch_Tree, and data structure information of each Branch_Tree is saved. m is an integer larger than 1.

In some examples, when the IP prefixes are IPv4 prefix, the processing of dividing each Multibit Trie into multiple layers at block 601 includes dividing the IPv4 prefixes in levels 0~31 of each Multibit Trie into 4 layers comprising layers 0~3 according to step sizes of 9, 8, 8 and 7 respectively.

When the IP prefixes are IPv6 prefixes, the processing of dividing each Multibit Trie into multiple levels at block 601 includes dividing the IPv6 prefixes in levels 0~127 of each Multibit Trie into 6 layers comprising layer 0~5 according to step sizes of 9, 24, 24, 24, 24 and 23 respectively.

The processing of expanding the routing of the IP prefixes in the highest levels 1~m of the Multibit Trie to the IP prefixes in the level m+1 according to the prefix expansion method includes expanding routing of IP prefixes in levels 1~8 of the Multibit Trie to IP prefixes in level 9 according to the prefix expansion method.

In some examples, the processing of storing the data structure information of each Branch_Tree includes: storing data structure information of Sub_Trie nodes in each layer in each Branch_Tree except layer 0; a step size of other Sub_Trie nodes is 8 except a step size of Sub_Trie nodes of a last level in a last layer is 7.

In some examples, the processing of storing the data structure information of each Branch_Tree further includes:

for each Sub_Trie node in each layer in each Branch_Tree except layer 0, expanding routing of IP prefixes in levels 0, 1 and 2 in the Sub_Trie node to IP prefixes in level 3 by using the prefix expansion method;

dividing each Sub_Trie node into eight segmented Sub_Trie nodes evenly, and saving data structure information of each segmented Sub_Trie node, wherein each segmented Sub_Trie node is indexed by IP prefixes of the highest 3 levels of the Sub_Trie node;

the processing of searching for the routing according to the data structure information pointer of the Sub_Trie node corresponding to the longest Hash hit result includes:

indexing a segmented Sub_Trie node in a Sub_Trie node according to the highest 3 bits of 8 bits corresponding to the Sub_Trie node in the IP address, and searching for the routing according to data structure information of the segmented Sub_Trie node.

In some examples, default routing of level-0 IP prefix is stored in a predefined area of an off-chip storage, and routing of prefixes in level 1~m is stored in a free area of the off-chip storage.

The process of storing the data structure information of each Branch_Tree includes: storing the data structure information of each Branch_Tree in the free area of the off-chip storage.

At block 602, after performing the calculation for the generated input key of each layer by using the Hash function of the layer, the following processing is included.

If no Hash hit result is found, the default routing is obtained from the predefined area of the off-chip storage, and the default routing is taken as routing found finally.

In some examples, when storing the data structure information of each Branch_Tree, for the Sub_Trie nodes of the last level in the last layer, the data structure information of the Sub_Trie node includes q Prefix Key and a Result Array pointer (ptr).

Each Prefix Key indicates lowest 7 bits of an IP address of a valid IP prefix in the Sub_Trie, and q is a predefined maximum number of valid IP prefixes in the Sub_Trie;

At block 602, when searching for the routing according to the data structure information pointer of the Sub_Trie node corresponding to the longest Hash hit result, if the Sub_Trie node of the last level in the last layer is searched, the low7 bits of the IP address is compared with Prefix Keys in the data structure information of each Sub_Trie node of the last level in the last layer. If the low7 bits of the IP address matches with the Prefix Key, the routing is determined according to the Result Array pointer corresponding to the matched Prefix Key.

Figure 5:
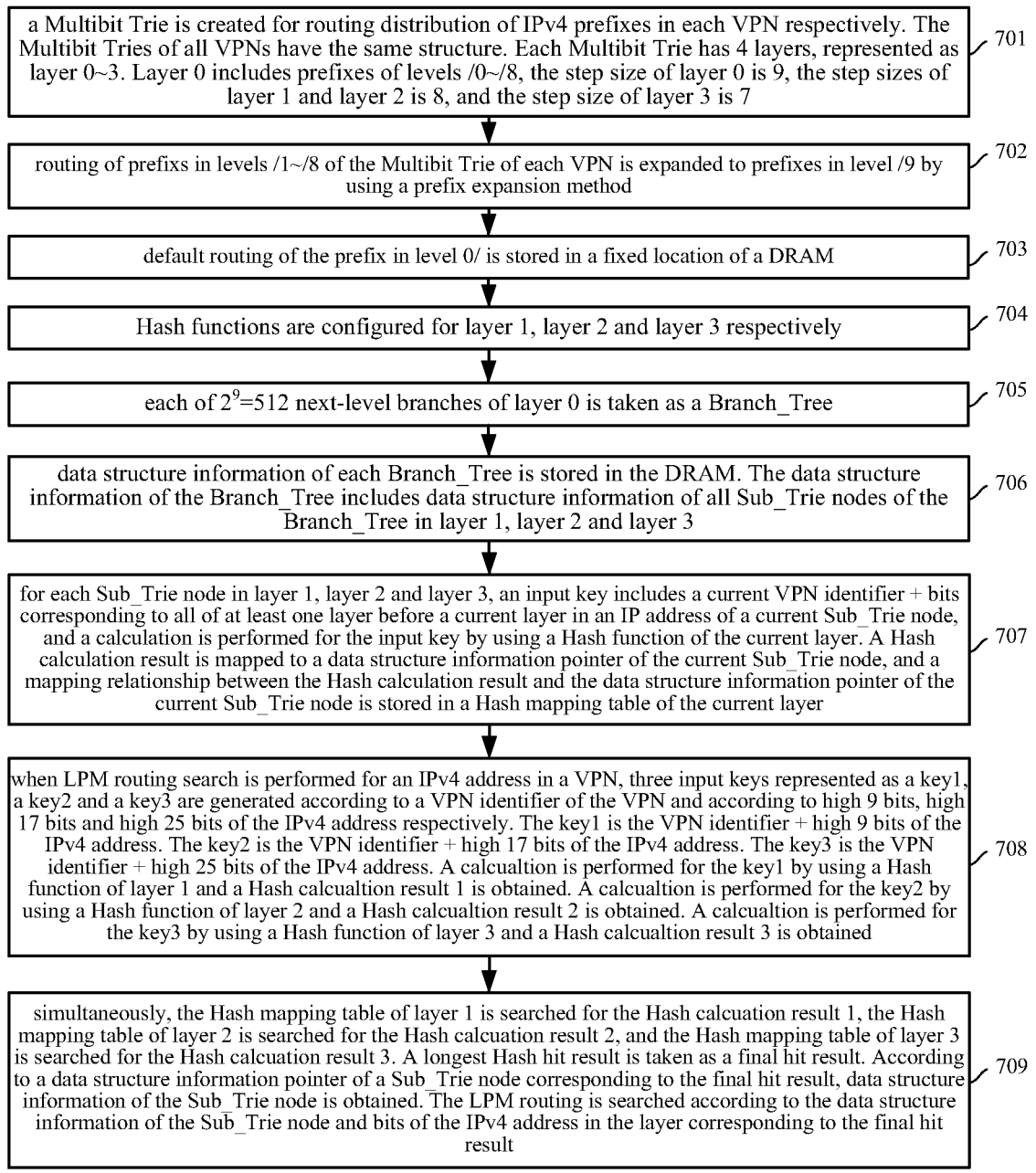
FIG. 5 is a flowchart illustrating an IPv4 routing search method based on a Multibit Trie according to some examples of the present disclosure.

FIG. 5 is a flowchart illustrating an IPV4 routing search method based on a Multibit Trie according to some examples of the present disclosure. As shown in FIG. 5, the method includes the following blocks.

At block 701, a Multibit Trie is created for routing distribution of IPv4 prefixes in each VPN respectively. The Multibit Tries of all VPNs have the same structure. Each Multibit Trie has 4 layers, represented as layer 0~3. Layer 0 includes prefixes of levels /0~/8, the step size of layer 0 is 9, the step sizes of layer 1 and layer 2 is 8, and the step size of layer 3 is 7.

The number of the VPNs is identical with the number of the configured Multibit Tries.

Figure 6:
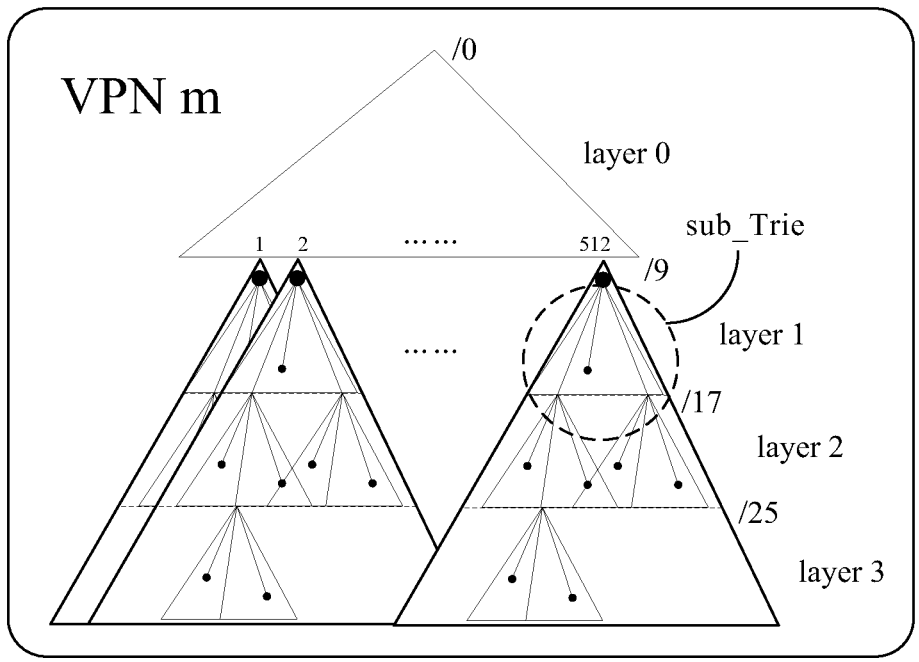
FIG. 6 is a diagram illustrating the structure of a Multibit Trie created for routing of IPv4 prefixes in a Virtual Private Network (VPN) according to some examples of the present disclosure.

FIG. 6 is a diagram illustrating the structure of a Multibit Trie created for routing distribution of IPv4 prefixes in a VPN (represented as VPN m) according to some examples of the present disclosure.

As shown in FIG. 6, the Multibit Trie includes prefixes of 32 levels, i.e. prefixes in levels /0~/31. Prefixes of layer 0 include prefixes in levels /0~/8 corresponding to the highest 9 bits of an IP address of 32 bits, i.e. the 1st to 9th bits, prefixes in of layer 1 include prefixes in levels /9~/16 corresponding to the 10th to 17th bits of the IP address of 32 bits, prefixes in of layer 2 include prefixes in levels /17~/24 corresponding to the 18th to 25th bits of the IP address of 32 bits, and prefixes of layer 3 include prefixes in levels /25~/31 corresponding to the 26th to 32nd bits of IP address of the 32 bits.

In some examples, the prefixes in levels /9~/31 of the Multibit Trie are divided according to step sizes of 8, 8 and 7, so as to make a segment including more valid prefixes be located in the bottom of layer 1 and layer 2, and further to decrease the number of sub_Trie nodes in the Multibit Trie.

At block 702, routing of prefixes in levels /1~/8 of the Multibit Trie of each VPN is expanded to prefixes in level /9 by using a prefix expansion method.

Prefix Expansion refers to equivalently expanding routing of a prefix with a short mark into multiple prefixes with a long short mark.

The Multibit Trie shown in FIG. 2 is taken as an example. The routing of prefixes in levels /0, /1 and /2 may be expanded into prefixes in level /3, which can be implemented as follows.

Routing of a prefix in level /0 may be expanded to prefixes in level /1.

Figures 1, 7:
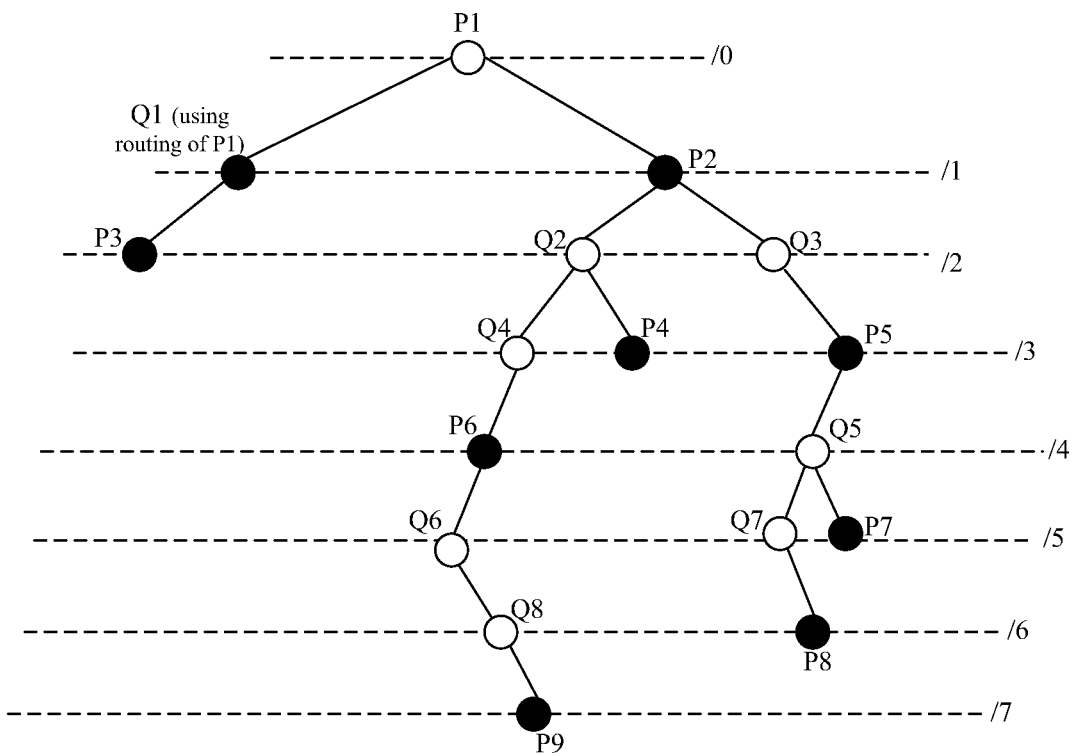
Figures 2, 7:
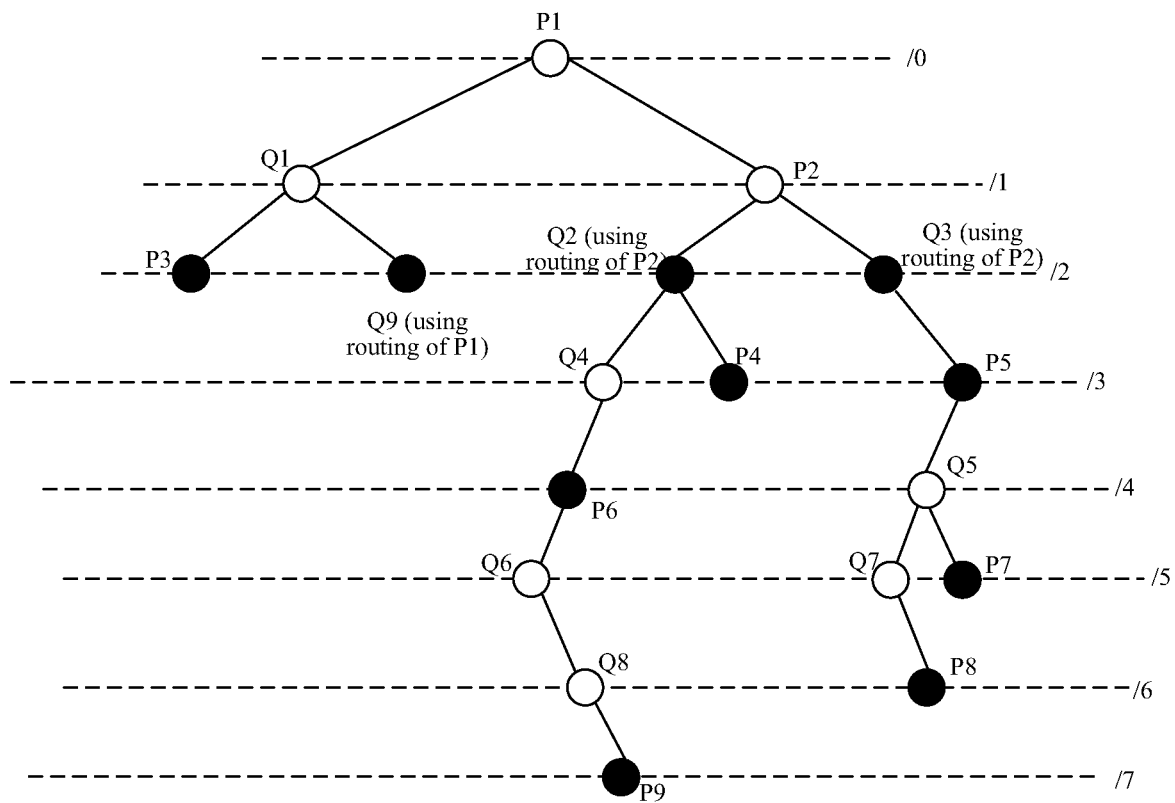
Figures 3, 7:
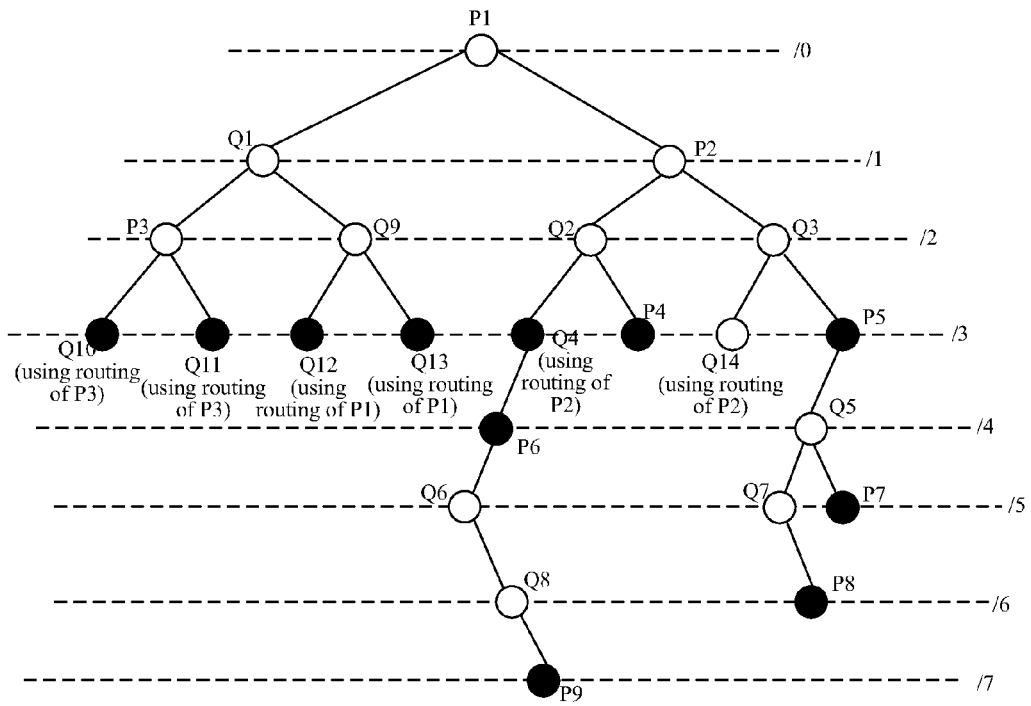

The routing of the prefix P1 in level /0 may be expanded to the prefixes Q1 and P2 in level /1. The prefix P2 is valid and the priority of the routing of the prefix P2 is higher than the priority of the routing of the prefix P1. The routing of the prefix P1 may be expanded to the prefix Q1, as shown in FIG. 7-1.

Routing of prefixes in level /1 may be expanded to prefixes in level /2.

There are two prefixes Q1 and P2 in level /1.

The routing of the prefix Q1 may be expanded to the prefixes P3 and Q9 in level /2. The prefix P3 is valid and the priority of the routing of the prefix P3 is higher than the priority of the routing of the prefix Q1. The routing of the prefix Q1 may be expanded to the prefix Q9, as shown in FIG. 7-2.

The routing the prefix P2 may be expanded to the prefixes Q2 and Q3 in level /2, as shown in FIG. 7-2.

Routing of prefixes in level /2 may be expanded to prefixes in level /3.

There are four prefixes P3, Q9, Q2 and Q3 in level /2.

The routing of the prefix P3 may be expanded to the prefixes Q10 and Q11 in level /3, as shown in FIG. 7-3.

The routing of the prefix Q9 may be expanded to the prefixes Q12 and Q13 in level /3, as shown in FIG. 7-3.

The routing of the prefix Q2 may be expanded to the prefixes Q4 and P4 in level /3. The prefix P4 has is valid and the priority of the routing of the prefix P4 is higher than the priority of the routing of the prefix Q2. The routing of the prefix Q2 (i.e., the routing of the prefix P2) may be expanded to the prefix Q4, as shown in FIG. 7-3.

The routing of the prefix Q3 may be expanded to the prefixes Q14 and P5 in level /3. The prefix P5 is valid and the priority of the routing of the prefix P5 is higher than the priority of the routing of the prefix Q3. The routing of the prefix Q3 may be expanded to the prefix Q14, as shown in FIG. 7-3.

At block 703, default routing of the prefix in level 0/ is stored in a fixed location of a DRAM.

Each VPN generally has default routing 0.0.0.0/0. If the default routing is expanded into prefixes in level /9 of the Multibit Trie by using the prefix expansion method, each Multibit Trie has 512 valid Branch_Trees, and a large number of redundant Branch_Trees are included in a multi-VPN routing table.

At block 704, Hash functions are configured for layer 1, layer 2 and layer 3 respectively.

At block 705, each of $2^9=512$ next-level branches of layer 0 is taken as a Branch_Tree.

Each Branch_Tree includes Sub_Tries of layer 1, layer 2 and layer 3, and step sizes of layer 1, layer 2 and layer 3 are respectively 8, 8 and 7.

At block 706, data structure information of each Branch_Tree is stored in the DRAM. The data structure information of the Branch_Tree includes data structure information of all Sub_Trie nodes of the Branch_Tree in layer 1, layer 2 and layer 3.

The data structure information of each Sub_Trie node in layer 1 and layer 2 includes the Internal Tree Bitmap, the Extending Paths Bitmap, the Result Array Pointer and the Child Node Pointer. Each Sub_Trie node in layer 3 has no next-level branch, and the data structure information of each Sub_Trie node in layer 3 includes the Internal Tree Bitmap and the Result Array Pointer.

According to the structure of the Multibit Trie, layer 0 always includes one Sub_Trie node, represented as Sub_Trie node 1;

if p branches of the Sub_Trie node 1 have next-level Sub_Trie nodes, layer 1 includes p Sub_Trie nodes;

if q branches of the Sub_Trie nodes in layer 1 have next-level Sub_Trie nodes, layer 2 includes q Sub_Trie nodes;

if r branches of the Sub_Trie nodes in layer 2 have next-level Sub_Trie nodes, layer 3 includes r Sub_Trie nodes.

In a Branch_Tree, layer 1 includes $2^9=512$ Sub_Trie nodes at most, layer 2 includes $2^{17}=128K$ Sub_Trie nodes at most, and layer 3 includes $2^{25}=32M$ Sub_Trie nodes at most.

At block 707, for each Sub_Trie node in layer 1, layer 2 and layer 3, an input key includes a current VPN identifier+ bits corresponding to all of at least one layer before a current layer in an IP address of a current Sub_Trie node, and a calculation is performed for the input key by using a Hash function of the current layer. A Hash calculation result is mapped to a data structure information pointer of the current Sub_Trie node, and a mapping relationship between the Hash calculation result and the data structure information pointer of the current Sub_Trie node is stored in a Hash mapping table of the current layer.

The data structure information pointer of the current Sub_Trie node is a first address for storing the data structure information of the current Sub_Trie node.

For example, the current VPN is VPN m, the Hash function of layer 1 is a first Hash function, the Hash function of layer 2 is a second Hash function, and the Hash function of layer 3 is a third Hash function.

It is supposed that layer 1 includes p Sub_Trie nodes. For each Sub_Trie node in layer 1, the input key is m+high 9 bits of an IP address of the Sub_Trie node, and a calculation is performed for the input key by using a first Hash function. A Hash calculation result is mapped to a data structure information pointer of the Sub_Trie node, and a mapping relationship between the Hash calculation result and the data structure information pointer of the Sub_Trie node is stored in a Hash mapping table of layer 1. The Hash mapping table of layer 1 stores p items of the mapping relationship between the Hash calculation results and the data structure information pointers of the Sub_Trie nodes.

The high 9 bits of the IP address of the Sub_Trie node is the highest 9 bits in the IP address of 32 bits of the Sub_Trie node.

It is supposed that layer 2 includes q Sub_Trie nodes. For each Sub_Trie node in layer 2, the input key is m+high 17 bits of an IP address of the Sub_Trie node, and a calculation is performed for the input key by using a second Hash function. A Hash calculation result is mapped to a data structure information pointer of the Sub_Trie node, and a mapping relationship between the Hash calculation result and the data structure information pointer of the Sub_Trie node is stored in a Hash mapping table of layer 2. The Hash mapping table of layer 2 stores q items of the mapping relationship between the Hash calculation results and the data structure information pointers of the Sub_Trie nodes.

The high 17 bits of the IP address of the Sub_Trie node is the highest 17 bits in the IP address of 32 bits of the Sub_Trie node.

It is supposed that layer 3 includes r Sub_Trie nodes. For each Sub_Trie node in layer 3, the input key is m+high 25 bits of an IP address of the Sub_Trie node, and a calculation is performed for the input key by using a third Hash function. A Hash calculation result is mapped to a data structure information pointer of the Sub_Trie node, and a mapping relationship between the Hash calculation result and the data structure information pointer of the Sub_Trie node is stored in a Hash mapping table of layer 3. The Hash mapping table of layer 3 stores r items of the mapping relationship between the Hash calculation results and the data structure information pointers of the Sub_Trie nodes.

The high 25 bits of the IP address of the Sub_Trie node is the highest 25 bits in the IP address of 32 bits of the Sub_Trie node.

At block 708, when LPM routing search is performed for an IPv4 address in a VPN, three input keys represented as a key1, a key2 and a key3 are generated according to a VPN identifier of the VPN and according to high 9 bits, high 17 bits and high 25 bits of the IPv4 address respectively. The key1 is the VPN identifier+high 9 bits of the IPv4 address. The key2 is the VPN identifier+high 17 bits of the IPv4 address. The key3 is the VPN identifier+high 25 bits of the IPv4 address. A calculation is performed for the key1 by using a Hash function of layer 1 and a Hash calculation result 1 is obtained. A calculation is performed for the key2 by using a Hash function of layer 2 and a Hash calculation result 2 is obtained. A calculation is performed for the key3 by using a Hash function of layer 3 and a Hash calculation result 3 is obtained.

At block 709, simultaneously, the Hash mapping table of layer 1 is searched for the Hash calculation result 1, the Hash mapping table of layer 2 is searched for the Hash calculation result 2, and the Hash mapping table of layer 3 is searched for the Hash calculation result 3. A longest Hash hit result is taken as a final hit result. According to a data structure information pointer of a Sub_Trie node corresponding to the final hit result, data structure information of the Sub_Trie node is obtained. The LPM routing is searched according to the data structure information of the Sub_Trie node and bits of the IPv4 address in the layer corresponding to the final hit result.

According to the lengths of node prefixes in layer 1, layer 2 and layer 3, the Hash hit result in layer 3 is longest, and the Hash hit result in layer 1 is shortest.

For example, if the Hash calculation result 3 is found from the Hash mapping table of layer 3, the Hash calculation result 3 is taken as the final hit result. According to the data structure information pointer of the Sub_Trie node corresponding to the Hash calculation result 3, the data structure information of the Sub_Trie node is obtained. The LPM routing is searched from layer 3 according to low 7 bits, i.e. the 26th to 32nd bits of the IPv4 address.

If the Hash calculation result 3 is not found from the Hash mapping table of layer 3 and the Hash calculation result 2 is found from the Hash mapping table of layer 2, the Hash calculation result 2 is taken as the final hit result. According to the data structure information pointer of the Sub_Trie node corresponding to the Hash calculation result 2, the data structure information of the Sub_Trie node is obtained. The LPM routing is searched from layer 2 according to the 18th to 25th bits in the IPv4 address.

If the Hash calculation result 3 is not found from the Hash mapping table of layer 3, the Hash calculation result 2 is not found from the Hash mapping table of layer 2 and the Hash calculation result 1 is found from the Hash mapping table of layer 1, the Hash calculation result 1 is taken as the final hit result. According to the data structure information pointer of the Sub_Trie node corresponding to the Hash calculation result 1, the data structure information of the Sub_Trie node is obtained. The LPM routing is searched from layer 1 according to the 10th to 17th bits in the IPv4 address.

If the Hash calculation result 3 is not found from the Hash mapping table of layer 3, the Hash calculation result 2 is not found from the Hash mapping table of layer 2 and the Hash calculation result 1 is not found from the Hash mapping table of layer 1, the default routing of the IP prefix in level 0/ stored in the fixed location of the DRAM is taken as the LPM routing.

In some examples, for the Multibit Trie corresponding to each VPN, data structure information of Sub_Trie nodes in other layers except layer 0 is saved in an external DRAM. The size of the data structure information of Sub_Trie nodes affects the access performance of the DRAM. In some examples, the step sizes of Sub_Trie nodes in layer 1~3 are 8, 8 and 7 respectively, and the data structure information of the Sub_Trie node includes:

Internal Tree Bitmap, which includes 255 bits,
Extending Paths Bitmap, which includes 256 bits,
Result Array Pointer, which includes 24 bits, and
Child Node Pointer, which includes 24 bits.

Accordingly, the data structure information of one Sub_Trie node includes 559 bits.

In order to reduce a storage space occupied by the data structure information of Sub_Trie nodes, each Sub_Trie node in other layers except layer 0 is optimized as follows:

routing of prefixes in levels /0, /1 and /2 of each Sub_Trie is expanded to prefixes in level /3 according to a prefix expansion method.

Figure 8:
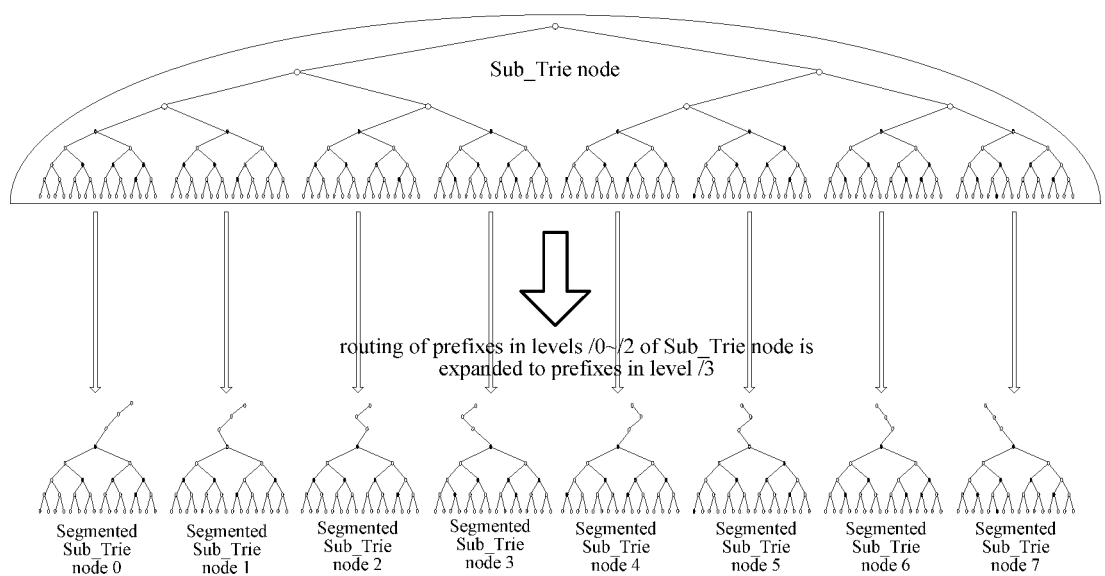
FIG. 8 is a diagram illustrating a process of dividing a Sub_Trie node into eight Segmented Sub_Tries according to some examples of the present disclosure.

In FIG. 8, the routing of prefixes in levels /0, /1 and /2 of a Sub_Trie node is expanded to prefixes in level /3.

Each Sub_Trie node is divided into 8 Segmented Sub_Trie nodes evenly, and data structure information of each Segmented Sub_Trie node is saved in the DRAM. The data structure information of each Segmented Sub_Trie node is indexed by the highest 3 bits of an IP address of the Segmented Sub_Trie node.

In Segmented Sub_Trie nodes 0~7 shown in FIG. 8, an index of Segmented Sub_Trie 0 is 000, an index of Segmented Sub_Trie 1 is 001, an index of Segmented Sub_Trie 2 is 010, an index of Segmented Sub_Trie 3 is 011, an index of Segmented Sub_Trie 4 is 100, an index of Segmented Sub_Trie 5 is 101, an index of Segmented Sub_Trie 6 is 110, and an index of Segmented Sub_Trie 7 is 111.

According to FIG. 8, the size of data structure information of each Segmented Sub_Trie node is one eighth of the size of original data structure information of the Sub_Trie node.

At block 709, when searching for the LPM routing according to the data structure information of the Sub_Trie node and bits of the IPv4 address in the layer, according to the highest 3 bits of 7 bits or 8 bits corresponding to the IPv4 address in the layer, a segmented Sub_Trie is indexed in the Sub_Trie node, and the LPM routing is searched according to the data structure information of the segmented Sub_Trie node. In this case, a search speed of the LPM routing can be improved greatly.

In a Branch_Tree, layer 1 has 512 Sub_Trie nodes at most, layer 2 has 64K Sub_Trie nodes at most, layer 3 has 16M Sub_Trie nodes at most, and so on. The number of Sub_Trie nodes in layers is increased orderly. Accordingly, the last layer has the largest number of Sub_Trie nodes. However, according to Internet routing and routing distribution of a data center, the number of routings in each Sub_Trie node in the last layer is usually smaller than 4. Accordingly, the data structure of the Sub_Trie node in the last layer is optimized as follows.

In order to distinguish the data structure of the Sub_Trie node in the last layer from the data structures of other Sub_Trie nodes, the data structure of the Sub_Trie node in the last layer is called a data structure of a Compressed Sub_Trie node, which includes 4 Prefix Keys and a Result Array ptr (24 bits).

Each Prefix key indicates the last 7 bits of an IP address of a valid IP prefix in the Sub_Trie node in the last layer. The length of a Prefix Key is 7 bits, and the length of 4 Prefix Keys is 28 bits. Accordingly, the Prefix Key may replace an Internal Tree Bitmap.

The length of the data structure of a Compressed Sub_Trie node is 52 bits.

At block 709, when searching for the LPM routing according to the data structure information of the Sub_Trie node and bits of the IPv4 address in the layer, if the layer is layer 3, 7 bits (i.e., the lowest 7 bits) of the IPv4 address in the layer (i.e. layer 3) is matched with a Prefix Key in the data structure of each Compressed Sub_Trie node in layer 3, and if the matching is successful, the LPM routing is determined according to the Result Array ptr. In this case, the search speed of the LPM routing can be improved greatly.

In some examples, for the purpose of avoiding Hash collision as much as possible, cuckoo Hash algorithm is used and three Hash functions are configured for each layer. For example, a Hash function 11, a Hash function 12 and a Hash function 13 are configured for layer 1; a Hash function 21, a Hash function 22 and a Hash function 23 are configured for layer 2; and a Hash function 31, a Hash function 32 and a Hash function 33 are configured for layer 3. Each Hash function corresponds to a Hash table. Each Hash table includes a preset number of locations, and each location uniquely represents a Hash calculation result. An input key corresponding to the Hash calculation result represented by each location and a data structure information pointer of a Sub_Trie node corresponding to the input key are stored in the location.

At block 707, for each Sub_Trie node in layer 1, layer 2 and layer 3, the following processing is performed by taking the current VPN identifier+bits corresponding to all of at least one layer before the current layer in the IP address of a current Sub_Trie node as the input key.

Calculations are performed for a current input key by using three Hash functions of the current layer respectively, and a location corresponding to each Hash calculation result is found in the Hash table corresponding to the Hash calculation result. If any one of three locations found in the three Hash tables is empty, the current input key and a data structure information pointer of the current Sub_Trie node are stored in the empty location. If none of three locations found in the three Hash tables is empty, a location is selected randomly from the three locations, an input key and a data structure information pointer of a Sub_Trie node which are stored in the selected location are removed, and the current input key and the data structure information pointer of the current Sub_Trie node are stored in the selected location. The above processing is performed for the removed input key by taking the removed input key as the current input key.

In some examples, before the above processing is performed for the removed input key, it is determined whether a preset number of input keys are removed continuously, if the preset number of input keys are removed continuously, the removed input key and the data structure information pointer of the Sub_Trie node corresponding to the removed input key are stored in a removed key list; otherwise, the above processing is performed for the removed input key.

At block 708, when the LPM routing search is performed for the IPv4 address in the VPN, the three input keys represented as the key1, the key2 and the key3 are generated according to the VPN identifier and according to high 9 bits, high 17 bits and high 25 bits of the IPv4 address respectively. The key1 is the VPN identifier+high 9 bits of the IPv4 address. The key2 is the VPN identifier+high 17 bits of the IPv4 address. The key3 is the VPN identifier+high 25 bits of the IPv4 address. Calculations are performed for the key1 by using the three Hash functions of layer 1 and three Hash calculation results are obtained. Calculations are performed for the key2 by using the three Hash functions of layer 2 and three Hash calculation results are obtained. Calculations are performed for the key3 by using the three Hash functions of layer 3 and three Hash calculation results are obtained.

At block 709, three Hash tables of layer 1 are searched for the Hash calculation results of layer 1 respectively. If the Hash calculation result is found, an input key stored at a location corresponding to the Hash calculation result is compared with the key1. If the input key stored at the location is identical with the key1, the key1 is determined as the Hash hit result. If the input key stored at the location is different from the key1, the removed key list of layer 1 is searched for the key1. If an input key identical with the key1 is found from the removed key list of layer 1, the key1 is determined as the Hash hit result.

Simultaneously, three Hash tables of layer 2 are searched for the Hash calculation results of layer 2 respectively. If the Hash calculation result is found, an input key stored at a location corresponding to the Hash calculation result is compared with the key2. If the input key stored at the location is identical with the key2, the key2 is determined as the Hash hit result. If the input key stored at the location is different from the key2, the removed key list of layer 2 is searched for the key2. If an input key identical with the key2 is found from the removed key list of layer 2, the key2 is determined as the Hash hit result.

Simultaneously, three Hash tables of layer 3 are searched for the Hash calculation results of layer 3 respectively. If the Hash calculation result is found, an input key stored at a location corresponding to the Hash calculation result is compared with the key3. If the input key stored at the location is identical with the key3, the key3 is determined as the Hash hit result. If the input key stored at the location is different from the key3, the removed key list of layer 3 is searched for the key3. If an input key identical with the key3 is found from the removed key list of layer 3, the key3 is determined as the Hash hit result.

The longest Hash hit result is taken as the final hit result. According to the data structure information pointer of the Sub_Trie node corresponding to the final hit result, the data structure information of the Sub_Trie node is obtained. The LPM routing is searched according to the data structure information of the Sub_Trie node and bits of the IPv4 address in the layer corresponding to the final hit result.

For example, calculations are performed for the key1 by using three Hash functions of layer 1, i.e. the Hash function 11, the Hash function 12 and the Hash function 13. Three Hash calculation results represented as a Hash calculation result 11, a Hash calculation result 12 and a Hash calculation result 13 are obtained. The Hash table 11 corresponding to the Hash function 11 is searched for a location corresponding to the Hash calculation result 11. The Hash table 12 corresponding to the Hash function 12 is searched for a location corresponding to the Hash calculation result 12. The Hash table 13 corresponding to the Hash function 13 is searched for a location corresponding to the Hash calculation result 13. For each found location, an input key stored at the location is compared with the key1. If the input key stored at any one location is identical with the key1, the key1 is determined as the Hash hit result. If no input key stored at the found location is identical with the key1, the removed key list of layer 1 is searched for the key1, if an input key identical with the key 1 is found from the removed key list of layer 1, the key1 is determined as the Hash hit result. Otherwise, it is determined that the layer 1 does not includes the Hash hit result.

In some examples, for the purpose of saving the storage occupied by the Hash tables, in the same layer of the Multibit Tries of all VPNs, the same Hash function uses the same Hash table.

Figure 9:
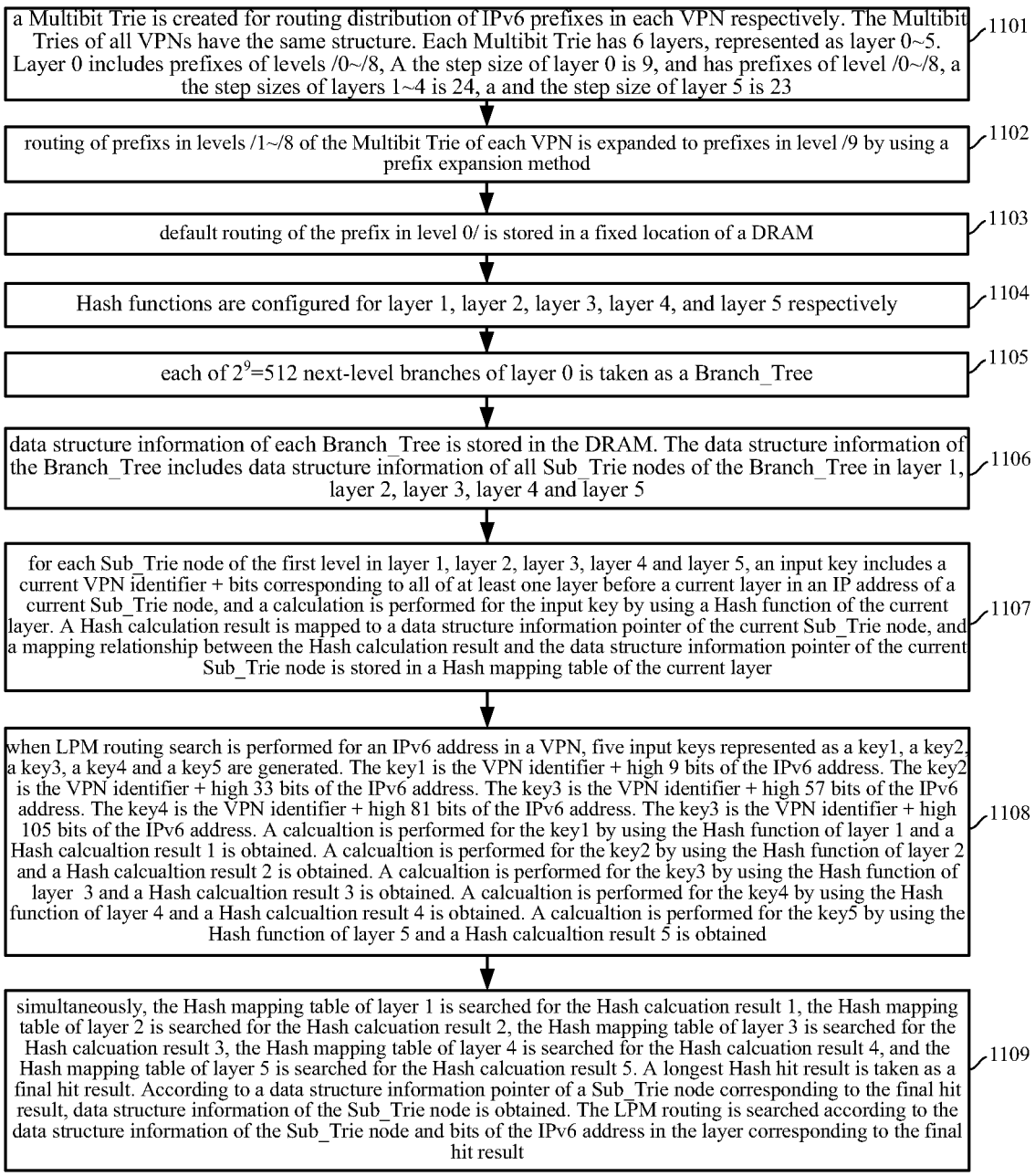
FIG. 9 is a flowchart illustrating an IPV6 routing search method based on a Multibit Trie according to some examples of the present disclosure.

FIG. 9 is a flowchart illustrating an IPV6 routing search method based on a Multibit Trie according to some examples of the present disclosure. As shown in FIG. 9, the method includes the following blocks.

At block 1101, a Multibit Trie is created for routing distribution of IPv6 prefixes in each VPN respectively. The Multibit Tries of all VPNs have the same structure. Each Multibit Trie has 6 layers, represented as layer 0~5. Layer 0 includes prefixes of levels /0~/8, A the step size of layer 0 is 9, and has prefixes of level /0~/8, a the step sizes of layers 1~4 is 24, a and the step size of layer 5 is 23.

The number of the VPNs is identical with the number of the configured Multibit Tries.

Figure 10:
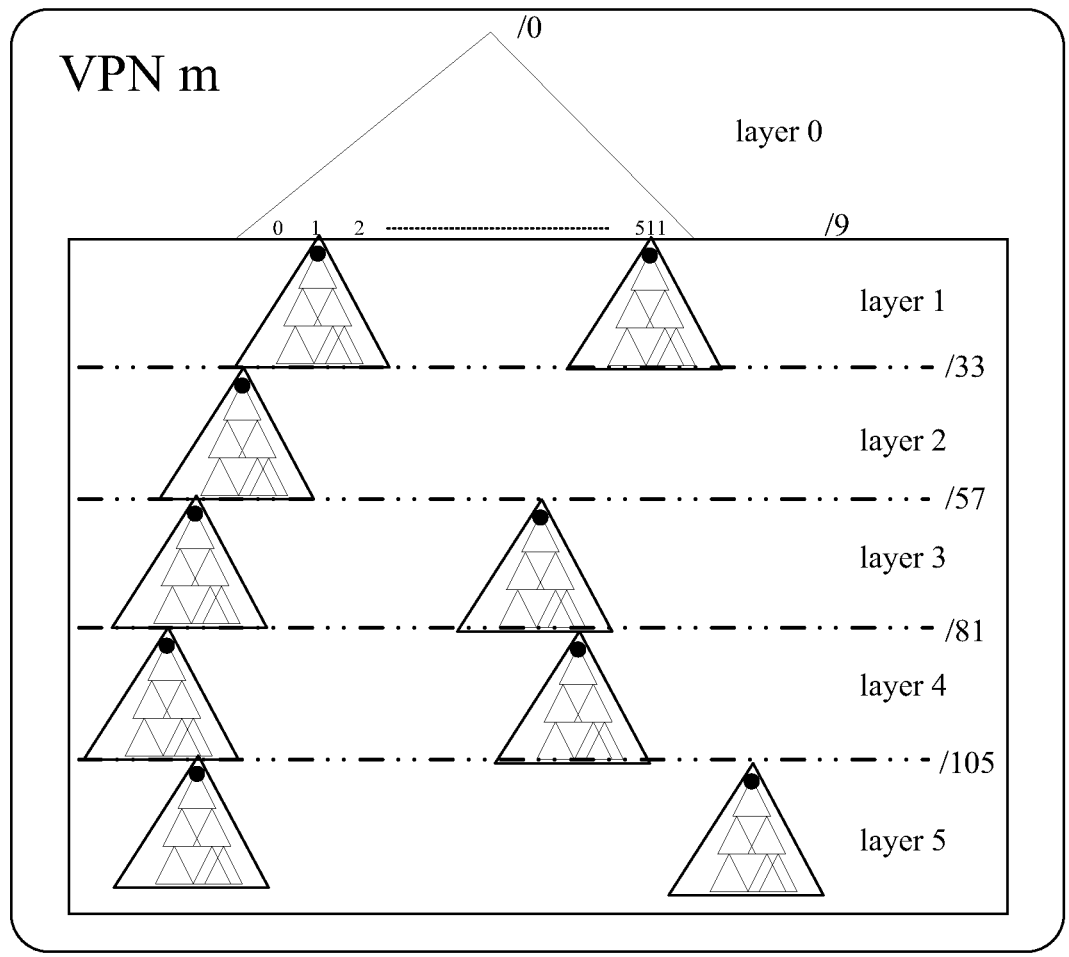
FIG. 10 is a diagram illustrating the structure of a Multibit Trie established for routing distribution of an IPv6 prefix in a Virtual Private Network (VPN) according to some examples of the present disclosure.

FIG. 10 is a diagram illustrating the structure of a Multibit Trie established for routing distribution of an IPv6 prefix in a VPN m according to some examples of the present disclosure.

As shown in FIG. 10, the Multibit Trie includes prefixes of 128 levels, i.e. prefixes in levels /0~/127. Prefixes of layer 0 include prefixes in levels /0~/8 corresponding to the highest 9 bits of an IP address of 128 bits, i.e. the 1st to 9th bits, prefixes of layer 1 include prefixes in levels /9~/32 corresponding to the 10th to 33rd bits of the IP address of 128 bits, prefixes of layer 2 include prefixes in levels /33~/56 corresponding to the 34th to 57th bits of the IP address of 128 bits, prefixes of layer 3 include prefixes in levels /57~/80 corresponding to the 58th to 81st bits of the IP address of 128 bits, prefixes of layer 4 includes prefixes in levels /81~/104 corresponding to the 82nd to 105th bits of the IP address of 128 bits, prefixes of layer 5 includes prefixes in levels /105~/127 corresponding to the 106th to 128th bits of the IP address of 128 bits.

In some examples, the prefixes in levels /9~/127 of the Multibit Trie are divided according to step sizes of 24, 24, 24, 24 and 23, so as to make a segment including more valid prefixes be located in the bottom of layer 1, layer 2, layer 3 and layer 4. Hence, the number of the sub_Trie nodes in the Multibit Trie is decreased.

At block 1102, routing of prefixes in levels /1~/8 of the Multibit Trie of each VPN is expanded to prefixes in level /9 by using a prefix expansion method.

At block 1103, default routing of the prefix in level 0/ is stored in a fixed location of a DRAM.

Each VPN generally has default routing 0.0.0.0/0. If the default routing is expanded into prefixes in level /9 of the Multibit Trie by using the prefix expansion method, each Multibit Trie has 512 valid Branch_Trees, and a large number of redundant Branch_Trees are included in a multi-VPN routing table.

At block 1104, Hash functions are configured for layer 1, layer 2, layer 3, layer 4, and layer 5 respectively.

At block 1105, each of $2^9=512$ next-level branches of layer 0 is taken as a Branch_Tree.

Each Branch_Tree includes Sub_Tries of layer 1, layer 2, layer 3, layer 4, and layer 5. Layer 1, layer 2, layer 3 and layer 4 include three levels of Sub_Trie nodes with a step size of 8. Layer 5 includes three levels of Sub_Trie nodes with step sizes of 8, 8, and 7.

At block 1106, data structure information of each Branch_Tree is stored in the DRAM. The data structure information of the Branch_Tree includes data structure information of all Sub_Trie nodes of the Branch_Tree in layer 1, layer 2, layer 3, layer 4 and layer 5.

The data structure information of each Sub_Trie node in layer 1, layer 2, layer 3 and layer 4 and each Sub_Trie node of first two levels in layer 5 includes the Internal Tree Bitmap, the Extending Paths Bitmap, the Result Array Pointer and the Child Node Pointer. Each Sub_Trie node of the last level in layer 5 has no next-level branch, and the data structure information of each Sub_Trie node of the last level in layer 5 includes the Internal Tree Bitmap and the Result Array Pointer.

According to the structure of the Multibit Trie, layer 0 always includes one Sub_Trie node, represented as Sub_Trie node 1;

if p1 branches of the Sub_Trie node 1 have next-level Sub_Trie nodes, layer 1 includes p1 Sub_Trie nodes of a first level;

if p2 branches of the p1 Sub_Trie nodes of the first level in layer 1 have next-level Sub_Trie nodes, layer 1 includes p2 Sub_Trie nodes of a second level;

if p3 branches of the p2 Sub_Trie nodes of the second level in layer 1 have next-level Sub_Trie nodes, layer 1 includes p3 Sub_Trie nodes of a third level;

if q1 branches of the p3 Sub_Trie nodes of the third level in layer 1 have next-level Sub_Trie nodes, layer 2 includes q1 Sub_Trie nodes of a first level;

if q2 branches of the q1 Sub_Trie nodes of the first level in layer 2 have next-level Sub_Trie nodes, layer 2 includes q2 Sub_Trie nodes of a second level;

if q3 branches of the q2 Sub_Trie nodes of the second level in layer 2 have next-level Sub_Trie nodes, layer 2 includes q3 Sub_Trie nodes of a third level;

if r1 branches of the q3 Sub_Trie nodes of the third level in layer 2 have next-level Sub_Trie nodes, layer 3 includes r1 Sub_Trie nodes of a first level;

if r2 branches of the r1 Sub_Trie nodes of the first level in layer 3 have next-level Sub_Trie nodes, layer 3 includes r2 Sub_Trie nodes of a second level;

if r3 branches of the r2 Sub_Trie nodes of the second level in layer 3 have next-level Sub_Trie nodes, layer 3 includes r3 Sub_Trie nodes of a third level;

if s1 branches of the r3 Sub_Trie nodes of the third level in layer 3 have next-level Sub_Trie nodes, layer 4 includes s1 Sub_Trie nodes of a first level;

if s2 branches of the s1 Sub_Trie nodes of the first level in layer 4 have next-level Sub_Trie nodes, layer 4 includes s2 Sub_Trie nodes of a second level;

if s3 branches of the s2 Sub_Trie nodes of the second level in layer 4 have next-level Sub_Trie nodes, layer 4 includes s3 Sub_Trie nodes of a third level;

if t1 branches of the s3 Sub_Trie nodes of the third level in layer 4 have next-level Sub_Trie nodes, layer 5 includes t1 Sub_Trie nodes of a first level;

if t2 branches of the t1 Sub_Trie nodes of the first level in layer 5 have next-level Sub_Trie nodes, layer 5 includes t2 Sub_Trie nodes of a second level;

if t3 branches of the t2 Sub_Trie nodes of the second level in layer 5 have next-level Sub_Trie nodes, layer 5 includes t3 Sub_Trie nodes of a third level.

At block 1107, for each Sub_Trie node of the first level in layer 1, layer 2, layer 3, layer 4 and layer 5, an input key includes a current VPN identifier+bits corresponding to all of at least one layer before a current layer in an IP address of a current Sub_Trie node, and a calculation is performed for the input key by using a Hash function of the current layer. A Hash calculation result is mapped to a data structure information pointer of the current Sub_Trie node, and a mapping relationship between the Hash calculation result and the data structure information pointer of the current Sub_Trie node is stored in a Hash mapping table of the current layer.

The data structure information pointer of the current Sub_Trie node is a first address for storing the data structure information of the current Sub_Trie node.

For example, the current VPN is VPN m, the Hash function of layer 1 is a first Hash function, the Hash function of layer 2 is a second Hash function, the Hash function of layer 3 is a third Hash function, the Hash function of layer 4 is a fourth Hash function, and the Hash function of layer 5 is a fifth Hash function.

It is supposed that the layer 1 includes p1 Sub_Trie nodes of the first level. For each Sub_Trie node of the first level in layer 1, the input key is m+high 9 bits of an IP address of the Sub_Trie node, and a calculation is performed for the input key by using the first Hash function. A Hash calculation result is mapped to a data structure information pointer of the Sub_Trie node, and a mapping relationship between the Hash calculation result and the data structure information pointer of the Sub_Trie node is stored in a Hash mapping table of layer 1. The Hash mapping table of the layer 1 stores p1 items of the mapping relationship between the Hash calculation results and the data structure information pointers of the Sub_Trie nodes.

The high 9 bits of the IP address of the Sub_Trie node is the highest 9 bits in the IP address of 128 bits of the Sub_Trie node.

It is supposed that layer 2 includes q1 Sub_Trie nodes of the first level. For each Sub_Trie node of the first level in layer 2, the input key is m+high 33 bits of an IP address of the Sub_Trie node, and a calculation is performed for the input key by using the second Hash function. A Hash calculation result is mapped to a data structure information pointer of the Sub_Trie node, and a mapping relationship between the Hash calculation result and the data structure information pointer of the Sub_Trie node is stored in a Hash mapping table of layer 2. The Hash mapping table of layer 2 stores q1 items of the mapping relationship between the Hash calculation results and the data structure information pointers of the Sub_Trie nodes.

The high 33 bits of the IP address of the Sub_Trie node is the highest 33 bits in the IP address of 128 bits of the Sub_Trie node.

It is supposed that layer 3 includes r1 Sub_Trie nodes of the first level. For each Sub_Trie node of the first level in layer 3, the input key is m+high 57 bits of an IP address of the Sub_Trie node, and a calculation is performed for the input key by using the third Hash function. A Hash calculation result is mapped to a data structure information pointer of the Sub_Trie node, and a mapping relationship between the Hash calculation result and the data structure information pointer of the Sub_Trie node is stored in a Hash mapping table of layer 3. The Hash mapping table of layer 3 stores r1 items of the mapping relationship between the Hash calculation results and the data structure information pointers of the Sub_Trie nodes.

The high 57 bits of the IP address of the Sub_Trie node is the highest 57 bits in the IP address of 128 bits of the Sub_Trie node.

It is supposed that layer 4 includes s1 Sub_Trie nodes of the first level. For each Sub_Trie node of the first level in layer 4, the input key is m+high 81 bits of an IP address of the Sub_Trie node, and a calculation is performed for the input key by using the fourth Hash function. A Hash calculation result is mapped to a data structure information pointer of the Sub_Trie node, and a mapping relationship between the Hash calculation result and the data structure information pointer of the Sub_Trie node is stored in a Hash mapping table of layer 4. The Hash mapping table of layer 4 stores s1 items of the mapping relationship between the Hash calculation results and the data structure information pointers of the Sub_Trie nodes.

The high 81 bits of the IP address of the Sub_Trie node is the highest 81 bits in the IP address of 128 bits of the Sub_Trie node.

It is supposed that layer 5 includes t1 Sub_Trie nodes of the first level. For each Sub_Trie node of the first level in layer 5, the input key is m+high 105 bits of an IP address of the Sub_Trie node, and a calculation is performed for the input key by using the fifth Hash function. A Hash calculation result is mapped to a data structure information pointer of the Sub_Trie node, and a mapping relationship between the Hash calculation result and the data structure information pointer of the Sub_Trie node is stored in a Hash mapping table of layer 5. The Hash mapping table of layer 5 stores t1 items of the mapping relationship between the Hash calculation results and the data structure information pointers of the Sub_Trie nodes.

The high 105 bits of the IP address of the Sub_Trie node is the highest 105 bits in the IP address of 128 bits of the Sub_Trie node.

At block 1108, when LPM routing search is performed for an IPv6 address in a VPN, five input keys represented as a key1, a key2, a key3, a key4 and a key5 are generated according to a VPN identifier of the VPN and according to high 9 bits, high 33 bits, high 57 bits, high 81 bits and high 105 bits of the IPv6 address respectively. The key1 is the VPN identifier+high 9 bits of the IPv6 address. The key2 is the VPN identifier+high 33 bits of the IPv6 address. The key3 is the VPN identifier+high 57 bits of the IPv6 address. The key4 is the VPN identifier+high 81 bits of the IPv6 address. The key3 is the VPN identifier+high 105 bits of the IPv6 address. A calculation is performed for the key1 by using the Hash function of layer 1 and a Hash calculation result 1 is obtained. A calculation is performed for the key2 by using the Hash function of layer 2 and a Hash calculation result 2 is obtained. A calculation is performed for the key3 by using the Hash function of layer 3 and a Hash calculation result 3 is obtained. A calculation is performed for the key4 by using the Hash function of layer 4 and a Hash calculation result 4 is obtained. A calculation is performed for the key5 by using the Hash function of layer 5 and a Hash calculation result 5 is obtained.

At block 1109, simultaneously, the Hash mapping table of layer 1 is searched for the Hash calculation result 1, the Hash mapping table of layer 2 is searched for the Hash calculation result 2, the Hash mapping table of layer 3 is searched for the Hash calculation result 3, the Hash mapping table of layer 4 is searched for the Hash calculation result 4, and the Hash mapping table of layer 5 is searched for the Hash calculation result 5. A longest Hash hit result is taken as a final hit result. According to a data structure information pointer of a Sub_Trie node corresponding to the final hit result, data structure information of the Sub_Trie node is obtained. The LPM routing is searched according to the data structure information of the Sub_Trie node and bits of the IPv6 address in the layer corresponding to the final hit result.

For example, if the Hash calculation result 5 is found from the Hash mapping table of layer 5, the Hash calculation result 5 is taken as the final hit result. According to the data structure information pointer of the Sub_Trie node corresponding to the Hash calculation result 5, the data structure information of the Sub_Trie node is obtained. The LPM routing is searched from layer 5 according to low 23 bits, i.e. the 106th to 128th bits of the IPv6 address.

If the Hash calculation result 5 is not found from the Hash mapping table of layer 5 and the Hash calculation result 4 is found from the Hash mapping table of layer 4, the Hash calculation result 4 is taken as the final hit result. According to the data structure information pointer of the Sub_Trie node corresponding to the Hash calculation result 4, the data structure information of the Sub_Trie node is obtained. The LPM routing is searched from layer 4 according to the 82nd to 105th bit in the IPv6 address.

If the Hash calculation result 5 is not found from the Hash mapping table of layer 5, the Hash calculation result 4 is not found from the Hash mapping table of layer 4 and the Hash calculation result 3 is found from the Hash mapping table of layer 3, the Hash calculation result 3 is taken as the final hit result. According to the data structure information pointer of the Sub_Trie node corresponding to the Hash calculation result 3, the data structure information of the Sub_Trie node is obtained. The LPM routing is searched from layer 3 according to the 58th to 81st bits in the IPv6 address.

If the Hash calculation result 5 is not found from the Hash mapping table of layer 5, the Hash calculation result 4 is not found from the Hash mapping table of layer 4, the Hash calculation result 3 is not found from the Hash mapping table of layer 3 and the Hash calculation result 2 is found from the Hash mapping table of layer 2, the Hash calculation result 2 is taken as the final hit result. According to the data structure information pointer of the Sub_Trie node corresponding to the Hash calculation result 2, the data structure information of the Sub_Trie node is obtained. The LPM routing is searched from layer 2 according to the 34th to 57th bits in the IPv6 address.

If the Hash calculation result 5 is not found from the Hash mapping table of layer 5, the Hash calculation result 4 is not found from the Hash mapping table of layer 4, the Hash calculation result 3 is not found from the Hash mapping table of layer 3, the Hash calculation result 2 is not found from the Hash mapping table of layer 2 and the Hash calculation result 1 is found from the Hash mapping table of layer 1, the Hash calculation result 1 is taken as the final hit result. According to the data structure information pointer of the Sub_Trie node corresponding to the Hash calculation result 1, the data structure information of the Sub_Trie node is obtained. The LPM routing is searched from layer 1 according to the 10th to 33rd bits in the IPv6 address.

If the Hash calculation result 5 is not found from the Hash mapping table of layer 5, the Hash calculation result 4 is not found from the Hash mapping table of layer 4, the Hash calculation result 3 is not found from the Hash mapping table of layer 3, the Hash calculation result 2 is not found from the Hash mapping table of layer 2 and the Hash calculation result 1 is not found from the Hash mapping table of layer 1, the default routing of the IP prefix in level 0/ stored in the fixed location of the DRAM is taken as the LPM routing.

In some examples, for IPv6 prefix, for the Multibit Trie corresponding to each VPN, data structure information of Sub_Trie nodes in other layers except layer 0 is saved in an external DRAM. The size of the data structure information of Sub_Trie nodes affects the access performance of the DRAM. In some examples, the step size of the Sub_Trie node is 8 or 7, and the data structure information of the Sub_Trie node includes:

Internal Tree Bitmap, which includes 255 bits,
Extending Paths Bitmap, which includes 256 bits,
Result Array Pointer, which includes 24 bits, and
Child Node Pointer, which includes 24 bits.

Accordingly, the data structure information of one Sub_Trie node includes 559 bits.

In order to reduce a storage space occupied by the data structure information of Sub_Trie nodes, each Sub_Trie node in other layers except layer 0 is optimized as follows:

routing of prefixes in levels /0, /1 and /2 of each Sub_Trie is expanded to prefixes in level /3 according to a prefix expansion method.

Each Sub_Trie node is divided into 8 Segmented Sub_Trie nodes evenly, and data structure information of each Segmented Sub_Trie node is saved in the DRAM. The data structure information of each Segmented Sub_Trie node is indexed by the highest 3 bits of an IP address of the Segmented Sub_Trie node, as shown in FIG. 8.

At block 1109, when searching for the LPM routing according to the data structure information of the Sub_Trie node and bits of the IPv6 address in a layer, 24 bits of the IPv6 address in the layer are used, and the LPM routing search is performed according to highest 8 bits, middle bits, lowest 8 bits or 7 bits of the IPv6 address. For each 8 bits or 7 bits, according to the highest 3 bits of 7 bits or 8 bits, a segmented Sub_Trie is indexed in the Sub_Trie node, and the LPM routing is searched according to the data structure information of the segmented Sub_Trie node. In this case, a search speed of the LPM routing can be improved greatly.

In some examples, the data structure of the Sub_Trie node of the last level in the last layer is optimized as follows:

In order to distinguish the data structure of the Sub_Trie node of the last level in the last layer from the data structures of other Sub_Trie nodes, the data structure of the Sub_Trie node of the last level in the last layer is called a data structure of a Compressed Sub_Trie node, which includes 4 Prefix Keys and a Result Array ptr (24 bits).

Each Prefix key indicates the last 7 bits of an IP address of a valid IP prefix in the Sub_Trie node in the last layer. The length of a Prefix Key is 7 bits, and the length of 4 Prefix Keys is 28 bits. Accordingly, the Prefix Key may replace an Internal Tree Bitmap.

The length of the data structure of a Compressed Sub_Trie node is 52 bits.

At block 1109, when searching for the LPM routing according to the data structure information of the Sub_Trie node and bits of the IPv6 address in the layer, if the layer is layer 5 and the lowest 7 bits of the IPv6 address is searched, the lowest 7 bits of the IPv6 address is matched with a Prefix Key in the data structure of each Compressed Sub_Trie node in layer 5, and if the matching is successful, the LPM routing is determined according to the Result Array ptr. In this case, the search speed of the LPM routing can be improved greatly.

In some examples, for the purpose of avoiding Hash collisions much as possible, cuckoo Hash algorithm is used and three Hash functions are configured for each layer. For example, a Hash function 11, a Hash function 12 and a Hash function 13 are configured for layer 1; a Hash function 21, a Hash function 22 and a Hash function 23 are configured for layer 2; a Hash function 31, a Hash function 32 and a Hash function 33 are configured for layer 3; a Hash function 41, a Hash function 42 and a Hash function 43 are configured for layer 4; a Hash function 51, a Hash function 52 and a Hash function 53 are configured for layer 5. Each Hash function corresponds to a Hash table. Each Hash table includes a preset number of locations, and each location uniquely represents a Hash calculation result. An input key corresponding to the Hash calculation result represented by each location and a data structure information pointer of a Sub_Trie node corresponding to the input key are stored in the location.

At block 1107, for each Sub_Trie node in layer 1, layer 2, layer 3, layer 4 and layer 5, the following processing is performed by taking the current VPN identifier+bits corresponding to all of at least one layer before the current layer in the IP address of a current Sub_Trie node as the input key.

Calculations are performed for a current input key by using three Hash functions of the current layer respectively, and a location corresponding to each Hash calculation result is found in the Hash table corresponding to the Hash calculation result. If any one of three locations found in the three Hash tables is empty, the current input key and a data structure information pointer of the current Sub_Trie node are stored in the empty location. If none of three locations found in the three Hash tables is empty, a location is selected randomly from the three locations, an input key and a data structure information pointer of a Sub_Trie node both stored in the selected location are removed, and the current input key and the data structure information pointer of the current Sub_Trie node are stored in the selected location. The above processing is performed for the removed input key by taking the removed input key as the current input key.

In some examples, before the above processing is performed for the removed input key, it is determined whether the number of input keys removed continuously reach a preconfigured value, if the number of input keys removed continuously reach the preconfigured value, the removed input key and the data structure information pointer of the Sub_Trie node corresponding to the removed input key are stored in a removed key list; if the number of input keys removed continuously does not reach the preconfigured value, the above processing is performed for the removed input key.

At block 1108, when the LPM routing search is performed for the IPv6 address in the VPN, the five input keys represented as the key1, the key2, the key3, the key4 and the key5 are generated according to the VPN identifier and according to high 9 bits, high 33 bits, high 57 bits, high 81 bits and high 105 bits of the IPv6 address respectively. The key1 is the VPN identifier+high 9 bits of the IPv6 address. The key2 is the VPN identifier+high 33 bits of the IPv6 address. The key3 is the VPN identifier+high 57 bits of the IPv6 address. The key4 is the VPN identifier+high 81 bits of the IPv6 address. The key5 is the VPN identifier+high 105 bits of the IPv6 address.

Calculations are performed for the key1 by using the three Hash functions of layer 1 and three Hash calculation results are obtained. Calculations are performed for the key2 by using the three Hash functions of layer 2 and three Hash calculation results are obtained. Calculations are performed for the key3 by using the three Hash functions of layer 3 and three Hash calculation results are obtained. Calculations are performed for the key4 by using the three Hash functions of layer 4 and three Hash calculation results are obtained. Calculations are performed for the key5 by using the three Hash functions of layer 5 and three Hash calculation results are obtained.

At block 1109, three Hash tables of layer 1 are searched for the Hash calculation results of layer 1 respectively. If the Hash calculation result is found, an input key stored at a location corresponding to the Hash calculation result is compared with the key1. If the input key stored at the location is identical with the key1, the key1 is determined as the Hash hit result. If the input key stored at the location is different from the key1, the removed key list of layer 1 is searched for the key1. If an input key identical with the key1 is found from the removed key list of layer 1, the key1 is determined as the Hash hit result.

Simultaneously, three Hash tables of layer 2 are searched for the Hash calculation results of layer 2 respectively. If the Hash calculation result is found, an input key stored at a location corresponding to the Hash calculation result is compared with the key2. If the input key stored at the location is identical with the key2, the key2 is determined as the Hash hit result. If the input key stored at the location is different from the key2, the removed key list of layer 2 is searched for the key2. If an input key identical with the key2 is found from the removed key list of layer 2, the key2 is determined as the Hash hit result.

Simultaneously, three Hash tables of layer 3 are searched for the Hash calculation results of layer 3 respectively. If the Hash calculation result is found, an input key stored at a location corresponding to the Hash calculation result is compared with the key3. If the input key stored at the location is identical with the key3, the key3 is determined as the Hash hit result. If the input key stored at the location is different from the key3, the removed key list of layer 3 is searched for the key3. If an input key identical with the key3 is found from the removed key list of layer 3, the key3 is determined as the Hash hit result.

Simultaneously, three Hash tables of layer 4 are searched for the Hash calculation results of layer 4 respectively. If the Hash calculation result is found, an input key stored at a location corresponding to the Hash calculation result is compared with the key4. If the input key stored at the location is identical with the key4, the key4 is determined as the Hash hit result. If the input key stored at the location is different from the key4, the removed key list of layer 4 is searched for the key4. If an input key identical with the key4 is found from the removed key list of layer 3, the key4 is determined as the Hash hit result.

Simultaneously, three Hash tables of layer 5 are searched for the Hash calculation results of layer 5 respectively. If the Hash calculation result is found, an input key stored at a location corresponding to the Hash calculation result is compared with the key5. If the input key stored at the location is identical with the key5, the key5 is determined as the Hash hit result. If the input key stored at the location is different from the key5, the removed key list of layer 5 is searched for the key5. If an input key identical with the key5 is found from the removed key list of layer 3, the key5 is determined as the Hash hit result.

The longest Hash hit result is taken as the final hit result. According to the data structure information pointer of the Sub_Trie node corresponding to the final hit result, the data structure information of the Sub_Trie node is obtained. The LPM routing is searched according to the data structure information of the Sub_Trie node and bits of the IPv6 address in the layer corresponding to the final hit result.

For example, calculations are performed for the key1 by using three Hash functions of layer 1, i.e. the Hash function 11, the Hash function 12 and the Hash function 13, Three Hash calculation results represented as a Hash calculation result 11, a Hash calculation result 12 and a Hash calculation result 13 are obtained. The Hash table 11 corresponding to the Hash function 11 is searched for a location corresponding to the Hash calculation result 11. The Hash table 12 corresponding to the Hash function 12 is searched for a location corresponding to the Hash calculation result 12. The Hash table 13 corresponding to the Hash function 13 is searched for a location corresponding to the Hash calculation result 13. For each found location, an input key stored at the location is compared with the key1. If the input key stored at any one location is identical with the key1, the key1 is determined as the Hash hit result. If no input key stored at the found location is identical with the key1, the removed key list of layer 1 is searched for the key1, if an input key identical with the key 1 is found from the removed key list of layer 1, the key1 is determined as the Hash hit result. Otherwise, it is determined that the layer 1 does not includes the Hash hit result.

In some examples, for the purpose of saving the storage occupied by the Hash tables, in the same layer of the Multibit Tries of all VPNs, the same Hash function uses the same Hash table.

The examples of the present disclosure support IPv4 and IPv6 routing of multiple VPNs. In some examples, the Multibit-Trie is divided into 512 Branch_Tree, and thus routing search speed is improved. The default routing is stored separately without expanding to layer 1, redundant nodes of the Multibit-Trie are reduced, and thus routing search speed is further improved. The Hash mapping is performed for the pointer of the Sub_Trie node of the first level in each layer. When searching for the LPM routing of the IP address, parallel search may be performed in the layers, and the LPM routing may be found according to the longest Hash hit result. Hence, the routing search speed is improved greatly. The cuckoo Hash algorithm is used and three Hash functions are configured for each layer, so that Hash collision is reduced, and routing search precision is improved. The Sub_Trie nodes are divided into 8 Segmented Sub_Trie nodes after the prefix expansion is performed, the routing search speed is further improved. The data structure of the Sub_Trie nodes in the last layer is simplified, and the routing search speed is further improved.

Figure 11:
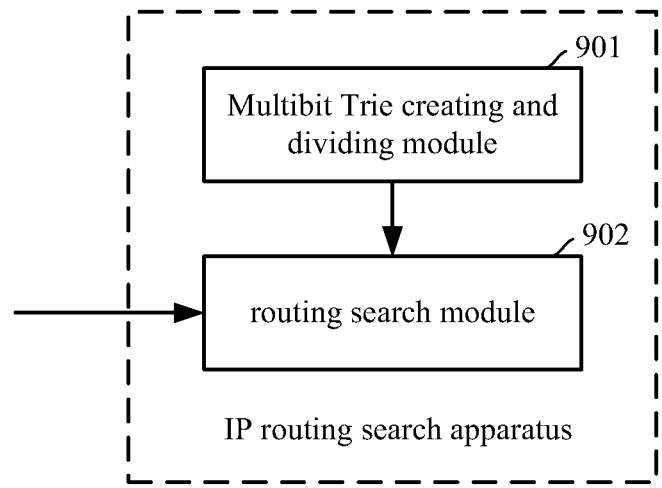
FIG. 11 is a diagram illustrating the structure of an IP routing search apparatus based on a Multibit Trie according to some examples of the present disclosure.

FIG. 11 is a diagram illustrating the structure of an IP routing search apparatus based on a Multibit Trie according to some examples of the present disclosure. As shown in FIG. 11, the IP routing search apparatus includes a Multibit Trie creating and dividing module 901 and a routing search module 902.

The Multibit Trie creating and dividing module 901 is to create a Multibit Trie for routing distribution of IP prefixes in each VPN; and divide each Multibit Trie into multiple layers.

The routing search module 902 is to, when routing search is performed for an IP address of a VPN, generate an input key for each layer respectively, the input key of the layer comprising a VPN identifier of the VPN and bits corresponding to all of at least one layer before the layer in the IP address; perform a calculation for the generated input key of each layer by using a Hash function of the layer; search for routing according to a data structure information pointer of a Sub_Trie node corresponding to a longest Hash hit result.

In some examples, the apparatus further includes a Hash mapping module. For each Sub_Trie node of a first level in each layer, the Hash mapping module is to preconfigure an input key comprising a current VPN identifier and bits corresponding to all of at least one layer before a current layer in an IP address of an IP prefix of a current Sub_Trie node; perform a calculation for the preconfigured input key by using a preconfigured Hash function of the current layer, and map a Hash calculation result to a data structure information pointer of the current Sub_Trie node In some examples, the Hash mapping module is further to preconfigure multiple Hash functions for each layer. Each Hash function corresponds to a Hash table; each location in the Hash table uniquely represents a Hash calculation result; and each location is used to store an input key corresponding to the Hash calculation result represented by the location and a data structure information pointer of a Sub_Trie node corresponding to the input key.

When performing the calculation for the preconfigured input key by using the preconfigured Hash function of the current layer, the Hash mapping module may perform a following process of:

a, performing the calculation for the preconfigured input key by using the preconfigured multiple Hash functions of the current layer respectively, and finding a location corresponding to each Hash calculation result in the Hash table corresponding to the Hash function;

if any one of multiple locations found in the multiple Hash tables is empty, storing the preconfigured input key and a data structure information pointer of a Sub_Trie node corresponding to the preconfigured input key in the empty location;

if none of multiple locations found in the multiple Hash tables is empty, randomly selecting a location from the multiple locations, removing an input key and a data structure information pointer of a Sub_Trie node both stored in the selected location, and storing the preconfigured input key and a data structure information pointer of a Sub_Trie node corresponding to the preconfigured input key in the selected location;

b, after the input key and the data structure information pointer of the Sub_Trie node are removed, determining whether the number of input keys removed continuously reach a preset value, if the number of input keys removed continuously reach the preset value, storing the removed input key and the data structure information pointer of the Sub_Trie node in a removed key list; if the number of input keys removed continuously does not reach the preset value, taking the removed input key as a preconfigured input key to perform the processing of step a.

In some examples, when performing the calculation for the generated input key of each layer by using the Hash function of the layer, the routing search module 902 may perform a following process of:

performing the calculation for the generated input key of each layer by using the multiple Hash functions of the layer, and obtaining multiple Hash calculation results;

for each Hash calculation result corresponding to the Hash function, searching the Hash table corresponding to the Hash function for a location corresponding to the Hash calculation result; if the location is found, comparing an input key stored at the location with the generated input key; if the input key stored at the location is identical with the generated input key, determining the Hash calculation result as a Hash hit result; if the input key stored at the location is different from the generated input key, searching the removed key list of the layer for the generated input key; if the removed key list comprising an input key identical with the generated input key, determining the Hash calculation result as the Hash hit result.

In some examples, the Multibit Trie creating and dividing module 901 is further to configure that, in the same layer of the Multibit Tries of all VPNs, the same Hash function uses the same Hash table.

In some examples, after creating the Multibit Trie, the Multibit Trie creating and dividing module 901 may further to expand routing of IP prefixes in the highest levels 1~m of the Multibit Trie to IP prefixes in level m+1 according to a prefix expansion method, wherein m is an integer larger than 1; take each branch of the IP prefixes in the level m+1 of the Multibit Trie as a Branch_Tree, and save data structure information of each Branch_Tree.

In some examples, when the IP prefixes are IPv4 prefixes, when dividing each Multibit Trie into multiple layers, the Multibit Trie creating and dividing module 901 may perform a following process of: dividing the IPv4 prefixes in levels 0~31 of each Multibit Trie into 4 layers comprising layers 0~3 according to step sizes of 9, 8, 8 and 7 respectively.

When the IP prefixes are IPv6 prefixes, when dividing each Multibit Trie into multiple layers, the Multibit Trie creating and dividing module 901 may perform a following process of: dividing the IPv6 prefixes in levels 0~127 of each Multibit Trie into 6 layers comprising layer 0~5 according to step sizes of 9, 24, 24, 24, 24 and 23 respectively;

When expanding the routing of the IP prefixes in the highest levels 1~m of the Multibit Trie to the IP prefixes in the level m+1 according to the prefix expansion method, the Multibit Trie creating and dividing module 901 may perform a following process of: expanding routing of IP prefixes in levels 1~8 of the Multibit Trie to IP prefixes in level 9 according to the prefix expansion method.

In some examples, when saving the data structure information of each Branch_Tree, the Multibit Trie creating and dividing module 901 may perform a following process of:

storing data structure information of Sub_Trie nodes in each layer in each Branch_Tree except layer 0; a step size of other Sub_Trie nodes is 8 except a step size of Sub_Trie nodes of a last level in a last layer is 7.

When saving the data structure information of each Branch_Tree, the Multibit Trie creating and dividing module 901 may further perform a following process of:

for each Sub_Trie node in each layer in each Branch_Tree except layer 0, expanding routing of IP prefixes in levels 0, 1 and 2 in the Sub_Trie node to IP prefixes in level 3; dividing each Sub_Trie node into eight segmented Sub_Trie nodes evenly, and saving data structure information of each segmented Sub_Trie node, wherein each segmented Sub_Trie node is indexed by IP prefixes of the highest 3 levels of the Sub_Trie node.

When searching for the routing according to the data structure information pointer of the Sub_Trie node corresponding to the longest Hash hit result, the routing search module 902 may perform a following process of:

indexing a segmented Sub_Trie node in a Sub_Trie node according to the highest 3 bits of 8 bits corresponding to the Sub_Trie node in the IP address, and searching for the routing according to data structure information of the segmented Sub_Trie node.

In some examples, the Multibit Trie creating and dividing module 901 is further to store default routing of a prefix in level 0 in a predefined area of an off-chip storage; store routing of prefixes in level 1~m in a free area of the off-chip storage.

When storing the data structure information of each Branch_Tree, the Multibit Trie creating and dividing module 901 may perform a following process of: storing the data structure information of each Branch_Tree in the free area of the off-chip storage.

After performing the calculation for the generated input key of each layer by using the Hash function of the layer, the routing search module 902 may further perform a following process of: when no Hash hit result is found, obtaining the default routing from the predefined area of the off-chip storage, and taking the default routing as routing found finally.

Figure 12:
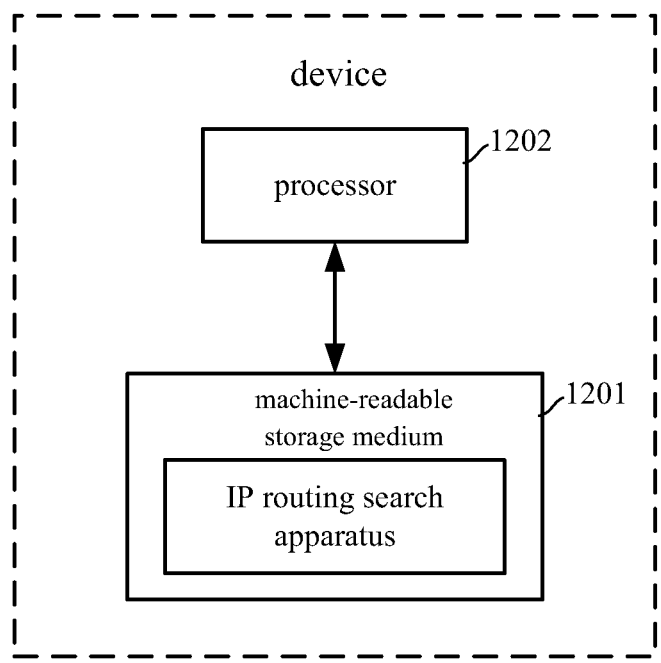
FIG. 12 is a diagram illustrating a hardware structure of a device including the IP routing search apparatus according to some examples of the present disclosure.

Some examples of the present disclosure also provide a device including the IP routing search apparatus. The device may be a programmable device combining software with hardware. A hardware structure of the device is shown in FIG. 12. The device includes a machine-readable storage medium 1201, a processor 1202, for example, a CPU, and other hardware (not shown in FIG. 10).

The machine-readable storage medium 1201 may store instruction codes. The instruction codes may be executed by the processor 1202, for example, the CPU, to implement the functions of the IP routing search apparatus.

The processor 1202, for example, the CPU, may communicate with the machine-readable storage medium 1201, read and execute the instruction codes stored in the machine-readable storage medium 1201 to implement the functions of the IP routing search apparatus.

When the IP routing search apparatus is a logic apparatus, the IP routing search apparatus is formed through executing the computer program instructions stored in the machine-readable storage medium by the CPU. When the computer program instructions are executed, the IP routing search apparatus is operated according to the above IP routing search method.

The machine-readable storage medium may be an electronic, magnetic or optical storage device or any physical storage device, and may include or store information such as executable instructions and data. For example, the machine-readable storage medium may be a Radom Access Memory (RAM), a transitory storage, a non-transitory storage, a flash memory, a storage driver such as a hard disk driver, a solid-state hard disk, any type of storage disk such as an optical disc and DVD, or a similar storage medium, or any combination thereof.

The foregoing are some examples of the present disclosure and are not used to limit the protection scope of the present disclosure. Any modification, equivalent substitution and improvement without departing from the spirit and principle of the present disclosure are within the protection scope of the present disclosure.

The invention claimed is:

1. An Internet Protocol (IP) routing search method, comprising:
creating a Multibit Trie for routing distribution of IP prefixes in each Virtual Private Network (VPN); and dividing each Multibit Trie into multiple layers according to a predefined search step size;
when routing search is performed for an IP address of a VPN,
generating an input key for each layer respectively, the input key of the layer comprising a VPN identifier of the VPN and bits to be searched, according to the predefined search step size, for all of at least one upper layer in the IP address; performing a calculation for the generated input key of each layer by using a Hash function of the layer; searching for routing according to a data structure information pointer of a Sub_Trie node corresponding to a longest Hash hit result;
preconfiguring multiple Hash functions for each layer; and each Hash function corresponding to a Hash table; Each location in the Hash table uniquely representing a Hash calculation result; and each location being used to store an input key corresponding to the Hash calculation result represented by the location and a data structure information pointer of a Sub_Trie node corresponding to the input key,
wherein performing the calculation for the generated input key of each layer by using the Hash function of the layer comprises:
performing the calculation for the generated input key of each layer by using the multiple Hash functions of the layer, and obtaining multiple Hash calculation results;
for each Hash calculation result corresponding to the Hash function, searching the Hash table corresponding to the Hash function for a location corresponding to the Hash calculation result; if the location is found, comparing an input key stored at the location with the generated input key; if the input key stored at the location is identical with the generated input key, determining the Hash calculation result as a Hash hit result; if the input key stored at the location is different from the generated input key, searching the removed key list of the layer for the generated input key; if the removed key list comprising an input key identical with the generated input key, determining the Hash calculation result as the Hash hit result.

2. The method of claim 1, further comprising:
for each Sub_Trie node of a first level in each layer, preconfiguring an input key comprising a current VPN identifier and bits to be searched, according to the predefined search step size, for all of at least one upper layer in an IP address of an IP prefix of a current Sub_Trie node; performing a calculation for the preconfigured input key by using a preconfigured Hash function of the current layer, and mapping a Hash calculation result to a data structure information pointer of the current Sub_Trie node.

3. The method of claim 2,
wherein performing the calculation for the preconfigured input key by using the preconfigured Hash function of the current layer comprises:

a, performing the calculation for the preconfigured input key by using the preconfigured multiple Hash functions of the current layer respectively, and finding a location corresponding to each Hash calculation result in the Hash table corresponding to the Hash function;
if any one of multiple locations found in the multiple Hash tables is empty, storing the preconfigured input key and a data structure information pointer of a Sub_Trie node corresponding to the preconfigured input key in the empty location;
if none of multiple locations found in the multiple Hash tables is empty, randomly selecting a location from the multiple locations, removing an input key and a data structure information pointer of a Sub_Trie node both stored in the selected location, and storing the preconfigured input key and a data structure information pointer of a Sub_Trie node corresponding to the preconfigured input key in the selected location;
b, after the input key and the data structure information pointer of the Sub_Trie node are removed, determining whether a number of input keys removed continuously reach a preset value, if the number of input keys removed continuously reach the preset value, storing the removed input key and the data structure information pointer of the Sub_Trie node in a removed key list; if the number of input keys removed continuously does not reach the preset value, taking the removed input key as a preconfigured input key to perform the processing of step a.

4. The method of claim 3, wherein each Hash function corresponding to a Hash table comprises: in the same layer of the Multibit Tries of all VPNs, the same Hash function using the same Hash table.

5. The method of claim 1, after creating the Multibit Trie, further comprising:
expanding routing of IP prefixes in the highest levels 1 to m of the Multibit Trie to IP prefixes in level m+1 according to a prefix expansion method, wherein m is an integer larger than 1;
taking each branch of the IP prefixes in the level m+1 of the Multibit Trie as a Branch_Tree, and saving data structure information of each Branch_Tree.

6. The method of claim 5, wherein when the IP prefixes are IPv4 prefixes, dividing each Multibit Trie into multiple layers comprises:
dividing the IPv4 prefixes in levels 0 to 31 of each Multibit Trie into 4 layers comprising layers 0 to 3 according to step sizes of 9, 8, 8 and 7 respectively;
when the IP prefixes are IPv6 prefixes, dividing each Multibit Trie into multiple layers comprises:
dividing the IPv6 prefixes in levels 0 to 127 of each Multibit Trie into 6 layers comprising layer 0 to 5 according to step sizes of 9, 24, 24, 24, 24 and 23 respectively;
expanding the routing of the IP prefixes in the highest levels 1 to m of the Multibit Trie to the IP prefixes in the level m+1 according to the prefix expansion method comprises:
expanding routing of IP prefixes in levels 1 to 8 of the Multibit Trie to IP prefixes in level 9 according to the prefix expansion method.

7. The method of claim 6, wherein saving the data structure information of each Branch_Tree comprises:
storing data structure information of Sub_Trie nodes in each layer in each Branch_Tree except layer 0; a step size of other Sub_Trie nodes is 8 except a step size of Sub_Trie nodes of a last level in a last layer is 7;

saving the data structure information of each Branch_Tree further comprises:

for each Sub_Trie node in each layer in each Branch_Tree except layer 0, expanding routing of IP prefixes in levels 0, 1 and 2 in the Sub_Trie node to IP prefixes in level 3 by using the prefix expansion method;

dividing each Sub_Trie node into eight segmented Sub_Trie nodes evenly, and saving data structure information of each segmented Sub_Trie node, wherein each segmented Sub_Trie node is indexed by IP prefixes of the highest 3 levels of the Sub_Trie node;

searching for the routing according to the data structure information pointer of the Sub_Trie node corresponding to the longest Hash hit result comprises:

indexing a segmented Sub_Trie node in a Sub_Trie node according to the highest 3 bits of 8 bits corresponding to the Sub_Trie node in the IP address, and searching for the routing according to data structure information of the segmented Sub_Trie node.

8. The method of claim 5, further comprising:

storing default routing of a prefix in level 0 in a predefined area of an off-chip storage; storing routing of prefixes in level 1 to m in a free area of the off-chip storage;

wherein storing the data structure information of each Branch_Tree comprising: storing the data structure information of each Branch_Tree in the free area of the off-chip storage;

after performing the calculation for the generated input key of each layer by using the Hash function of the layer, the method further comprises:

when no Hash hit result is found, obtaining the default routing from the predefined area of the off-chip storage, and taking the default routing as routing found finally.

9. An Internet Protocol (IP) routing search apparatus, comprising:

a Multibit Trie creating and dividing module, to create a Multibit Trie for routing distribution of IP prefixes in each Virtual Private Network (VPN); and divide each Multibit Trie into multiple layers according to a predefined search step size;

a routing search module, when routing search is performed for an IP address of a VPN, to generate an input key for each layer respectively, the input key of the layer comprising a VPN identifier of the VPN and bits to be searched, according to the predefined search step size, for all of at least one upper layer in the IP address; perform a calculation for the generated input key of each layer by using a Hash function of the layer; search for routing according to a data structure information pointer of a Sub_Trie node corresponding to a longest Hash hit result: and a Hash mapping module, to preconfigure multiple Hash functions for each layer; and each Hash function corresponding to a Hash table; each location in the Hash table uniquely representing a Hash calculation result; and each location being used to store an input key corresponding to the Hash calculation result represented by the location and a data structure information pointer of a Sub_Trie node corresponding to the input key;

wherein when performing the calculation for the generated input key of each layer by using the Hash function of the layer, the routing search module is to perform a process of:

performing the calculation for the generated input key of each layer by using the multiple Hash functions of the layer, and obtaining multiple Hash calculation results;

for each Hash calculation result corresponding to the Hash function, searching the Hash table corresponding to the Hash function for a location corresponding to the Hash calculation result; if the location is found, comparing an input key stored at the location with the generated input key; if the input key stored at the location is identical with the generated input key, determining the Hash calculation result as a Hash hit result; if the input key stored at the location is different from the generated input key, searching the removed key list of the layer for the generated input key; if the removed key list comprising an input key identical with the generated input key, determining the Hash calculation result as the Hash hit result.

10. The apparatus of claim 9, further comprising:

wherein the Hash mapping module is further to: for each Sub_Trie node of a first level in each layer, preconfigure an input key comprising a current VPN identifier and bits to be searched, according to the predefined search step size, for all of at least one upper layer in an IP address of an IP prefix of a current Sub_Trie node; and perform a calculation for the preconfigured input key by using a preconfigured Hash function of the current layer, and map a Hash calculation result to a data structure information pointer of the current Sub_Trie node.

11. The apparatus of claim 10, wherein when performing the calculation for the preconfigured input key by using the preconfigured Hash function of the current layer, the Hash mapping module is to perform a process of:

a, performing the calculation for the preconfigured input key by using the preconfigured multiple Hash functions of the current layer respectively, and finding a location corresponding to each Hash calculation result in the Hash table corresponding to the Hash function;

if any one of multiple locations found in the multiple Hash tables is empty, storing the preconfigured input key and a data structure information pointer of a Sub_Trie node corresponding to the preconfigured input key in the empty location;

if none of multiple locations found in the multiple Hash tables is empty, randomly selecting a location from the multiple locations, removing an input key and a data structure information pointer of a Sub_Trie node both stored in the selected location, and storing the preconfigured input key and a data structure information pointer of a Sub_Trie node corresponding to the preconfigured input key in the selected location;

b, after the input key and the data structure information pointer of the Sub_Trie node are removed, determining whether a number of input keys removed continuously reach a preset value, if the number of input keys removed continuously reach the preset value, storing the removed input key and the data structure information pointer of the Sub_Trie node in a removed key list; if the number of input keys removed continuously does not reach the preset value, taking the removed input key as a preconfigured input key to perform the processing of step a.

12. The apparatus of claim 9, wherein, after creating the Multibit Trie, the Multibit Trie creating and dividing module is further to:

expand routing of IP prefixes in the highest levels 1 to m of the Multibit Trie to IP prefixes in level m+1 according to a prefix expansion method, wherein m is an integer larger than 1;

take each branch of the IP prefixes in the level m+1 of the Multibit Trie as a Branch_Tree, and save data structure information of each Branch_Tree; when the IP prefixes are IPv4 prefixes, when dividing each Multibit Trie into multiple layers, the Multibit Trie creating and dividing module is to perform a process of:

dividing the IPv4 prefixes in levels 0 to 31 of each Multibit Trie into 4 layers comprising layers 0 to 3 according to step sizes of 9, 8, 8 and 7 respectively;

when the IP prefixes are IPv6 prefixes, when dividing each Multibit Trie into multiple layers, the Multibit Trie creating and dividing module 901 is to perform a process of:

dividing the IPv6 prefixes in levels 0 to 127 of each Multibit Trie into 6 layers comprising layer 0 to 5 according to step sizes of 9, 24, 24, 24, 24 and 23 respectively;

when expanding the routing of the IP prefixes in the highest levels 1 to m of the Multibit Trie to the IP prefixes in the level m+1 according to the prefix expansion method, the Multibit Trie creating and dividing module is to perform a process of:

expanding routing of IP prefixes in levels 1 to 8 of the Multibit Trie to IP prefixes in level 9 according to the prefix expansion method.

13. The apparatus of claim 12, wherein, when saving the data structure information of each Branch_Tree, the Multibit Trie creating and dividing module is to perform a process of:

storing data structure information of Sub_Trie nodes in each layer in each Branch_Tree except layer 0; a step size of other Sub_Trie nodes is 8 except a step size of Sub_Trie nodes of a last level in a last layer is 7;

when saving the data structure information of each Branch_Tree, the Multibit Trie creating and dividing module is further to perform a process of:

for each Sub_Trie node in each layer in each Branch_Tree except layer 0, expanding routing of IP prefixes in levels 0, 1 and 2 in the Sub_Trie node to IP prefixes in level 3; dividing each Sub_Trie node into eight segmented Sub_Trie nodes evenly, and saving data structure information of each segmented Sub_Trie node, wherein each segmented Sub_Trie node is indexed by IP prefixes of the highest 3 levels of the Sub_Trie node;

when searching for the routing according to the data structure information pointer of the Sub_Trie node corresponding to the longest Hash hit result, the routing search module is to perform a process of:

indexing a segmented Sub_Trie node in a Sub_Trie node according to the highest 3 bits of 8 bits corresponding to the Sub_Trie node in the IP address, and searching for the routing according to data structure information of the segmented Sub_Trie node.

14. The apparatus of claim 12, wherein the Multibit Trie creating and dividing module is further to store default routing of a prefix in level 0 in a predefined area of an off-chip storage; store routing of prefixes in level 1 to m in a free area of the off-chip storage;

wherein when storing the data structure information of each Branch_Tree, the Multibit Trie creating and dividing module is to perform a process of: storing the data structure information of each Branch_Tree in the free area of the off-chip storage;

after performing the calculation for the generated input key of each layer by using the Hash function of the layer, the routing search module is further to perform a process of:

when no Hash hit result is found, obtaining the default routing from the predefined area of the off-chip storage, and taking the default routing as routing found finally.

15. An Internet Protocol (IP) routing search apparatus, comprising a non-transitory machine-readable storage medium which stores instruction codes and a processor, the instruction codes being configured to cause the processor to execute the method according to claim 1.

16. A non-transitory machine-readable storage medium storing computer program instructions for executing the method according to claim 1 when the computer program instructions are executed.

* * * * *